(12) United States Patent
Utsugi

(10) Patent No.: US 8,374,360 B2
(45) Date of Patent: Feb. 12, 2013

(54) SOUND SETTING APPARATUS AND SOUND SETTING METHOD

(75) Inventor: Makoto Utsugi, Chiba (JP)

(73) Assignee: Sony Corporation (JP)

( * ) Notice: Subject to any disclaimer, the term of this patent is extended or adjusted under 35 U.S.C. 154(b) by 159 days.

(21) Appl. No.: 12/592,604

(22) Filed: Nov. 30, 2009

(65) Prior Publication Data
US 2010/0166221 A1 Jul. 1, 2010

(30) Foreign Application Priority Data
Dec. 9, 2008 (JP) ................ P2008-313750

(51) Int. Cl.
*H03G 5/00* (2006.01)
(52) U.S. Cl. ............ 381/98; 381/104; 381/86; 345/156; 345/184
(58) Field of Classification Search ............ 381/98–109, 381/119, 86; 700/94; 345/156–184; 715/700–866
See application file for complete search history.

(56) References Cited

U.S. PATENT DOCUMENTS

| | | | |
|---|---|---|---|
| 6,703,550 B2 * | 3/2004 | Chu ................... | 84/609 |
| 7,418,671 B2 | 8/2008 | Hama et al. | |
| 7,518,055 B2 * | 4/2009 | Zartarian ............ | 84/615 |
| 7,529,377 B2 * | 5/2009 | Nackvi et al. ...... | 381/103 |
| 7,680,574 B2 * | 3/2010 | Berg et al. .......... | 701/41 |
| 2005/0190930 A1 * | 9/2005 | Desiderio ........... | 381/103 |
| 2007/0008305 A1 * | 1/2007 | Kosinski et al. .... | 345/184 |
| 2007/0300180 A1 | 12/2007 | Hama et al. | |
| 2007/0300187 A1 | 12/2007 | Hama et al. | |
| 2008/0080720 A1 * | 4/2008 | Jacob et al. ........ | 381/103 |

FOREIGN PATENT DOCUMENTS

| | | |
|---|---|---|
| JP | 03080707 A | 4/1991 |
| JP | 05046114 A | 2/1993 |
| JP | 06327089 A | 11/1994 |
| JP | 06350367 A | 12/1994 |
| JP | 2000077960 A | 3/2000 |
| JP | 2001237660 A | 8/2001 |
| JP | 2005-078145 A | 3/2005 |
| JP | 2005197863 A | 7/2005 |
| JP | 2007160981 A | 6/2007 |
| JP | 2007-257650 A | 10/2007 |
| JP | 2008067040 A | 3/2008 |
| JP | 2008136112 A | 6/2008 |
| JP | 2008-152682 A | 7/2008 |

OTHER PUBLICATIONS

Office Action from Japanese Application No. 2008-313750, dated Oct. 14, 2010.

* cited by examiner

*Primary Examiner* — Vivian Chin
*Assistant Examiner* — Fatimat O Olaniran
(74) *Attorney, Agent, or Firm* — Lerner, David, Littenberg, Krumholz & Mentlik, LLP

(57) ABSTRACT

A sound setting apparatus includes: a manipulating unit capable of making an input manipulation in upward, downward, left, right, and rotation directions; a band setting unit that sets each of individual frequency bands corresponding to low, midrange, and high frequencies in controlling an equalizer, in response to an input manipulation to the manipulating unit in the left and right directions; a level setting unit that sets an output level of each of the bands set by the band setting unit, in response to an input manipulation in the upward and downward directions; a center frequency setting unit that sets a center frequency of each of the bands set by the band setting unit, in response to an input manipulation in the rotation directions; and a display unit that collectively displays setting images to set the band, the output level, and the center frequency on a screen on the same layer.

6 Claims, 20 Drawing Sheets

CONFIGURATION OF APPEARANCE OF CAR AUDIO SYSTEM

CONFIGURATION OF APPEARANCE OF CAR AUDIO SYSTEM

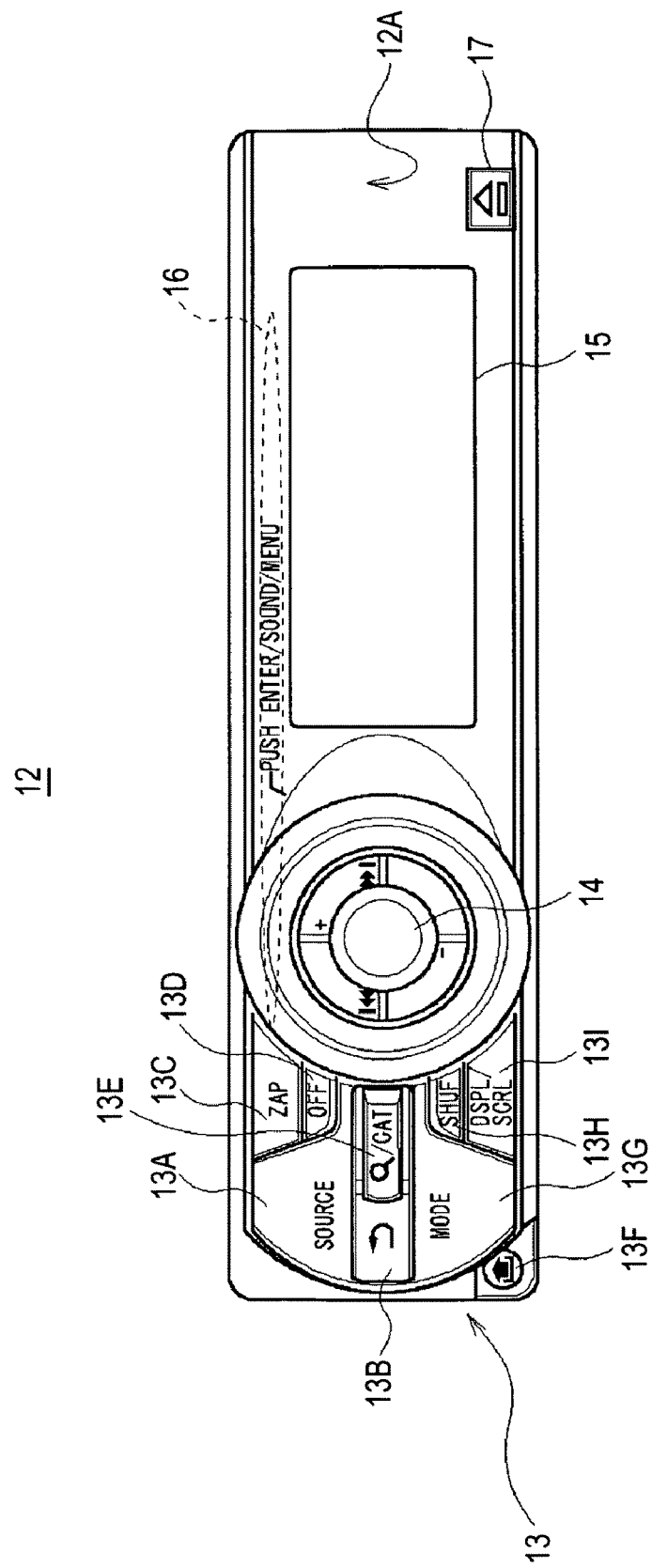

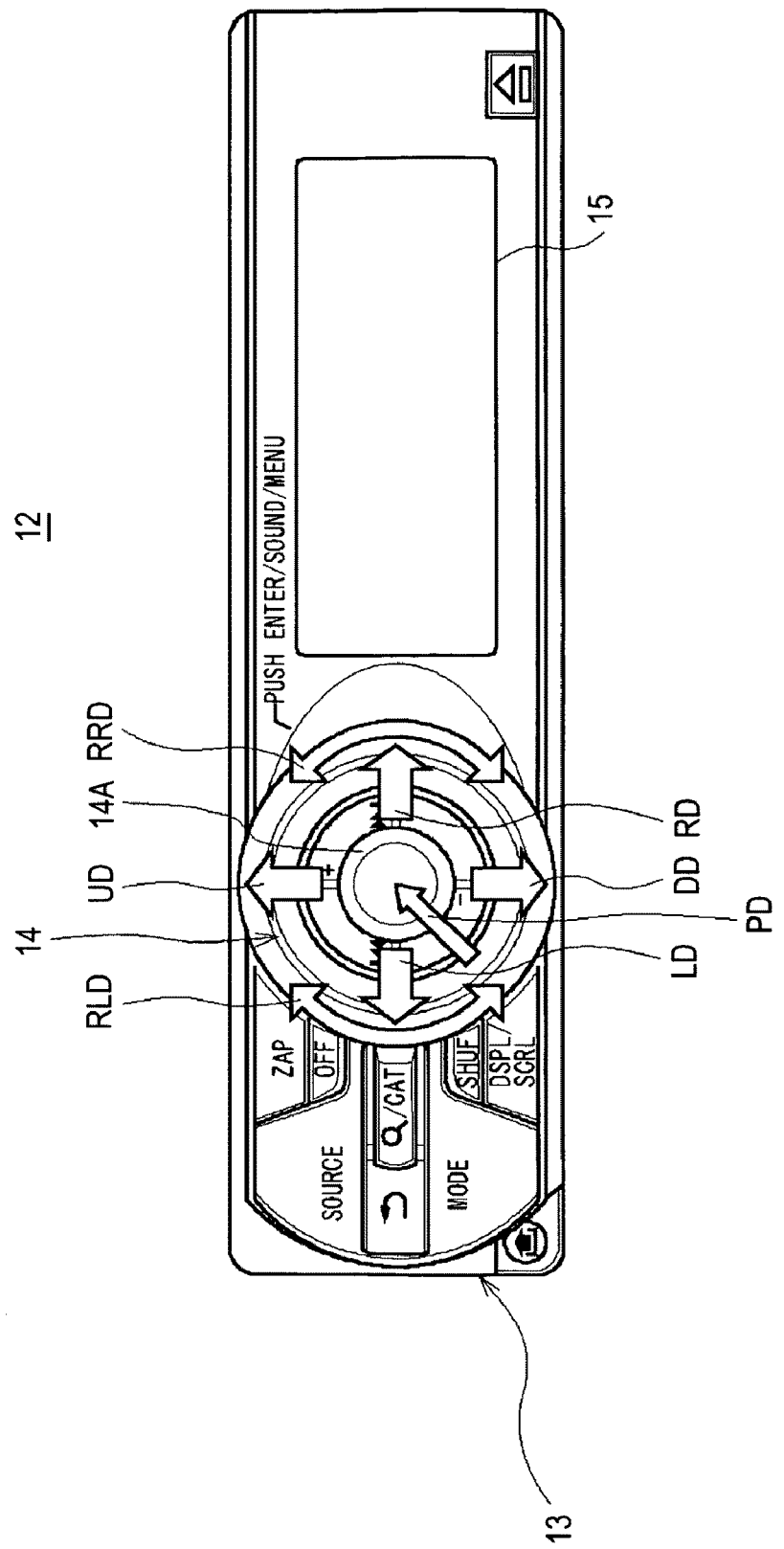

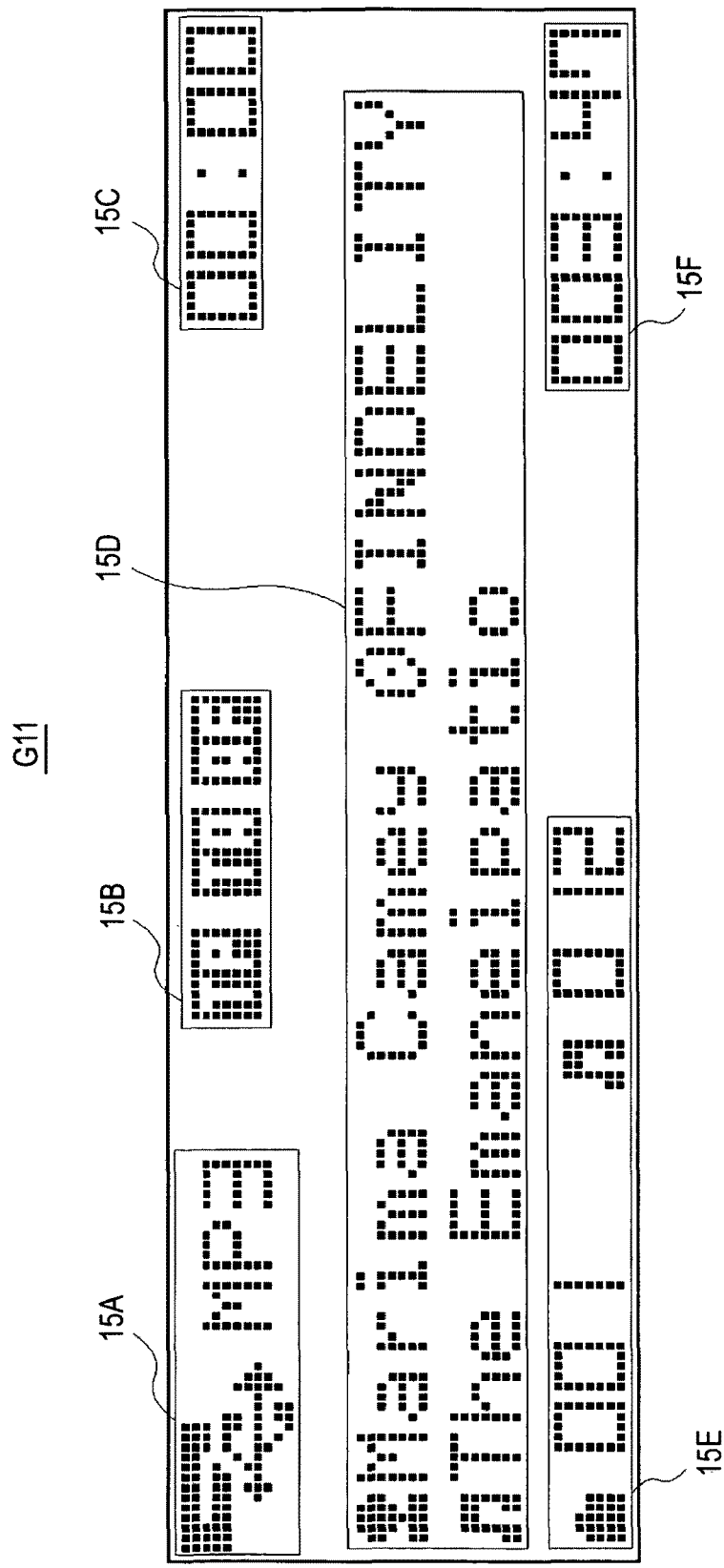

FM

CD

AUX

SOURCE ICON

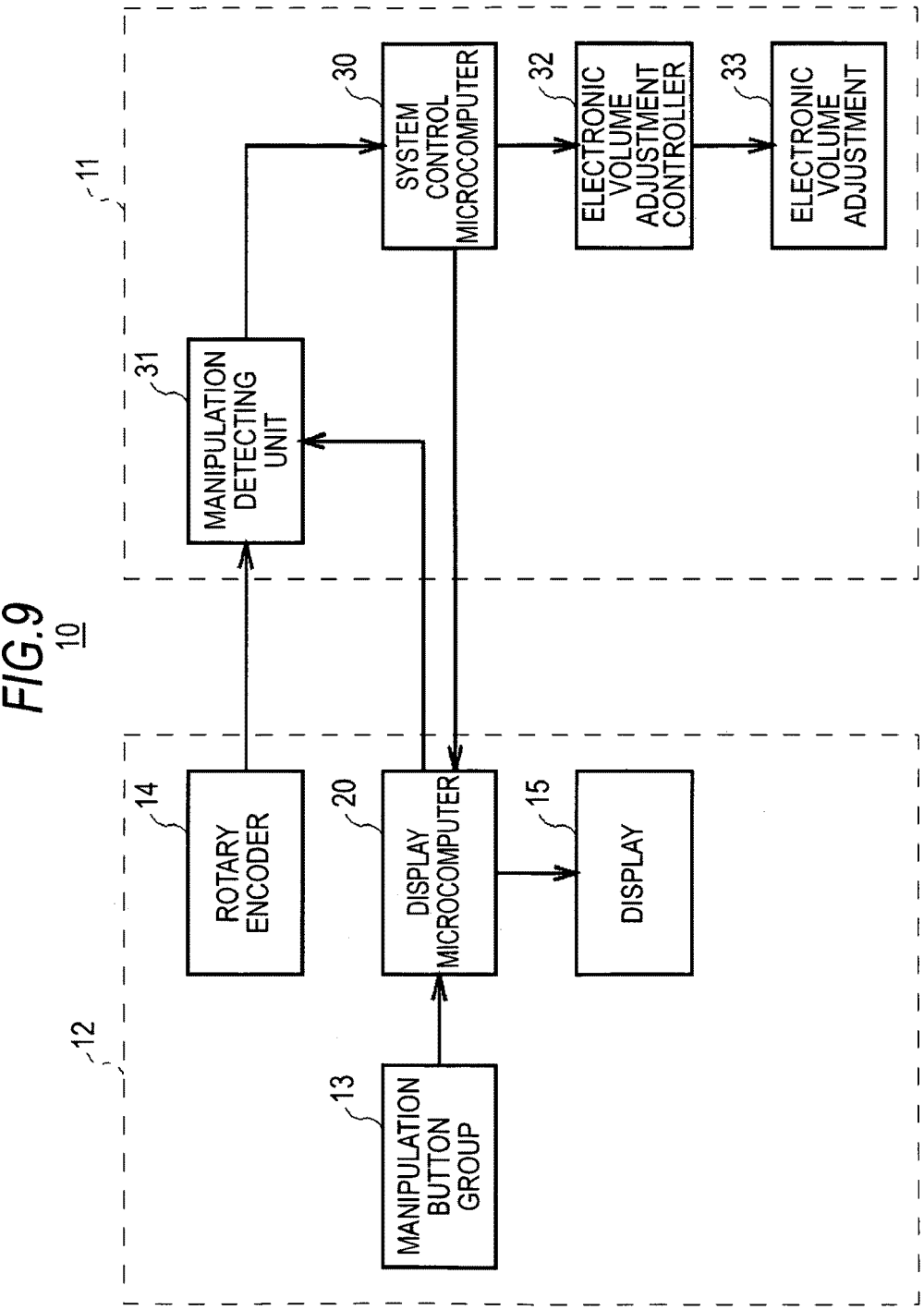

EQUALIZER SETTING METHOD ACCORDING TO THE INVENTION

SCREEN TRANSITIONS ACCORDING TO THE INVENTION (1)

MANIPULATION ICON

UPWARD DIRECTION IS INOPERABLE

DOWNWARD DIRECTION IS INOPERABLE

WHEN UPWARD AND DOWNWARD DIRECTIONS ARE INOPERABLE

LEFT DIRECTION IS INOPERABLE

RIGHT DIRECTION IS INOPERABLE

WHEN LEFT AND RIGHT DIRECTIONS ARE INOPERABLE

RIGHT ROTATION DIRECTION IS INOPERABLE

LEFT ROTATION DIRECTION IS INOPERABLE

WHEN LEFT AND RIGHT ROTATION DIRECTIONS ARE INOPERABLE

SUBWOOFER SETTING METHOD ACCORDING TO THE INVENTION

SCREEN TRANSITIONS ACCORDING TO THE INVENTION (2)

SOUND SETTING APPARATUS AND SOUND SETTING METHOD

CROSS-REFERENCE TO RELATED APPLICATION

The present application claims priority from Japanese Patent Application No. JP 2008-313750 filed in the Japanese Patent Office on Dec. 9, 2008, the entire content of which is incorporated herein by reference.

BACKGROUND OF THE INVENTION

1. Field of the Invention

The present invention relates to a sound setting apparatus and a sound setting method, which are suited for application to a car audio system, for example.

2. Description of the Related Art

Heretofore, a car audio system is installed in the dashboard of a vehicle (not shown) to receive radio broadcasts or play a CD (Compact Disc), and allows a user to listen to the output sounds through speakers of the vehicle.

As shown in FIG. 1, in this type of car audio system 1, the following screen transitions are performed from a normal state in which a source screen G1 ((A) in FIG. 1), which shows that audio signals are being reproduced, is displayed on a display 3 in a front panel 2.

In this normal state ((A) in FIG. 1), when an input manipulation is made to a rotary commander RC, which can be moved up and down, side to side, rotated, and pressed down, the car audio system 1 switches the screen from the source screen G1 to a sound menu screen G2 ((B) in FIG. 1).

On the sound menu screen G2 ((B) in FIG. 1), the car audio system 1 selects menu items related to audio settings such as menu items "equalizer parametric", "lowpass filter", "fader", and "balance", in response to rotating the rotary commander RC.

The car audio system 1 finally determines a menu item selected at this time, in response to pressing down the rotary commander RC.

For example, when the rotary commander RC is pressed down as the menu item "equalizer parametric" is selected for a menu item, the car audio system 1 switches the screen from the sound menu screen G2 ((B) in FIG. 1) to an equalizer curve selection screen G3 ((C) in FIG. 1).

On the equalizer curve selection screen G3 ((C) in FIG. 1), the car audio system 1 selects an equalizer curve desired by a user, in response to rotating the rotary commander RC.

After that, when the rotary commander RC is pressed down as the equalizer curve desired by the user is selected, the car audio system 1 switches the screen from the equalizer curve selection screen G3 ((C) in FIG. 1) to an equalizer mode screen G4 ((D) in FIG. 2) as shown in (D) in FIG. 2.

On the equalizer mode screen G4 ((D) in FIG. 2), the car audio system 1 selects a menu item "Tune" or "Initialize", in response to rotating the rotary commander RC.

After that, when the rotary commander RC is pressed down as the menu item "Tune" is selected through the rotary commander RC, the car audio system 1 switches the screen from the equalizer mode screen G4 ((D) in FIG. 2) to a band selection screen G5 ((E) in FIG. 2).

On the band selection screen G5 ((E) in FIG. 2), when the rotary commander RC is rotated, the car audio system 1 selects any one of frequency bands "LOW", "MID", and "HIGH" to be adjusted by an equalizer.

When the rotary commander RC is pressed down as any one of the frequency bands "LOW", "MID", and "HIGH" is selected through the rotary commander RC, the car audio system 1 switches the screen from the band selection screen G5 to a center frequency selection screen G6 ((F) in FIG. 2).

On the center frequency selection screen G6 ((F) in FIG. 2), the car audio system 1 selects a center frequency in the band chosen on the band selection screen G5 ((E) in FIG. 2), in response to rotating the rotary commander RC.

After that, when the rotary commander RC is pressed down as the center frequency is selected through the rotary commander RC, the car audio system 1 switches the screen from the center frequency selection screen G6 ((F) in FIG. 2) to a level adjustment screen G7 ((G) in FIG. 2).

On the level adjustment screen G7 ((G) in FIG. 2), the car audio system 1 selects an output level in the band chosen on the band selection screen G5, in response to rotating the rotary commander RC.

After that, every time when a predetermined back button is pressed down, the car audio system 1 makes screen transitions as returning to the level adjustment screen G7, the center frequency selection screen G6, the band selection screen G5, the equalizer mode screen G4, the equalizer curve selection screen G3, the sound menu screen G2, and the source screen G1 in this order.

In other words, as shown in FIG. 3, the car audio system 1 has the source screen G1 ((A) in FIG. 1) to the level adjustment screen G7 ((G) in FIG. 2) formed of a plurality of layers, and in turn makes screen transitions, in response to pressing down the rotary commander RC, or the back button.

In addition, in cellular telephones whose disk jog dial can be rotated and pressed down, some of the cellular telephones display menus in a plurality of layers (for example, see JP-A-2005-78145 (Patent Document 1)).

SUMMARY OF THE INVENTION

Because the car audio system 1 in this configuration is formed to control the equalizer through the source screen G1 to the level adjustment screen G7 formed of a plurality of layers, a problem arises that a user has to perform complicated settings between layers.

In addition, because it is difficult for the car audio system 1 to allow the user to visually recognize screen details in different layers on the same screen at the same time, a problem arises that it is difficult to allow the user to recognize the overall processes in controlling the equalizer, which causes difficulties of use.

Thus, it is desirable to propose a sound setting apparatus and a sound setting method in which a user is allowed to easily make sound settings with no necessities for the user to perform complicated manipulations while the user is allowed to recognize the overall processes in controlling the equalizer.

A sound setting apparatus according to an embodiment of the invention includes: a manipulating unit capable of making an input manipulation in upward and downward directions, left and right directions, and rotation directions; a band setting unit that sets each of individual frequency bands corresponding to low frequencies, midrange frequencies, and high frequencies in controlling an equalizer, in response to an input manipulation to the manipulating unit in the left and right directions; a level setting unit that sets an output level of each of the bands set by the band setting unit, in response to an input manipulation to the manipulating unit in the upward and downward directions; a center frequency setting unit that sets a center frequency of each of the bands set by the band setting unit, in response to an input manipulation to the manipulating unit in the rotation directions; and a display unit that collectively displays setting images to set the band, the output level, and the center frequency on a screen on the same layer.

With this configuration, because the setting images used to set the band, the output level, and the center frequency can be collectively displayed on the same layer through the manipulating unit when settings are made, a user is allowed to make sound settings with no necessities for the user to perform complicated settings between layers, while the user is allowed to recognize the entire overall processes for band settings, output level settings, and center frequency settings in controlling the equalizer.

A sound setting method according to another embodiment of the invention includes the steps of: setting each of individual frequency bands corresponding to low frequencies, midrange frequencies, and high frequencies by a band setting unit in controlling an equalizer, in response to making an input manipulation to a manipulating unit in left and right directions, the manipulating unit capable of making an input manipulation in upward and downward directions, the left and right directions, and rotation directions; setting an output level of each of the bands, in response to making an input manipulation to the manipulating unit in the upward and downward directions; setting a center frequency of each of the bands, in response to making an input manipulation to the manipulating unit in the rotation directions; and collectively displaying images to set the band, the output level, and the center frequency by a display unit on a screen on the same layer, wherein the setting steps are conducted regardless of order.

With this configuration, because the setting images used to set the band, the output level, and the center frequency can be collectively displayed on the same layer through the manipulating unit when settings are made, a user is allowed to make sound settings with no necessities for the user to perform complicated settings between layers, while the user is allowed to recognize the entire overall processes for band settings, output level settings, and center frequency settings in controlling the equalizer.

According to the embodiments of the invention, a sound setting apparatus and a sound setting method can be implemented, in which because the setting images used to set the band, the output level, and the center frequency can be collectively displayed on the same layer through the manipulating unit when settings are made, a user is allowed to make sound settings with no necessities for the user to perform complicated settings between layers, while the user is allowed to recognize the entire overall processes for band settings, output level settings, and center frequency settings in controlling the equalizer.

BRIEF DESCRIPTION OF THE DRAWINGS

FIG. 5 shows a schematic diagram depicting the configuration of a front panel;

FIG. 6 shows a schematic diagram depicting the directions to make input manipulations to a rotary encoder;

FIG. 7 shows a schematic diagram depicting exemplary representation of a display in playing a USB device;

FIG. 9 shows a schematic diagram depicting the circuitry configurations of the car audio system;

DESCRIPTION OF THE PREFERRED EMBODIMENTS

Hereinafter, embodiments of the invention will be described in detail with reference to the drawings.

Preferred embodiments (hereinafter, referred to as embodiments) will be described below. In addition, the descriptions will be given in the following order.

Figure 4:
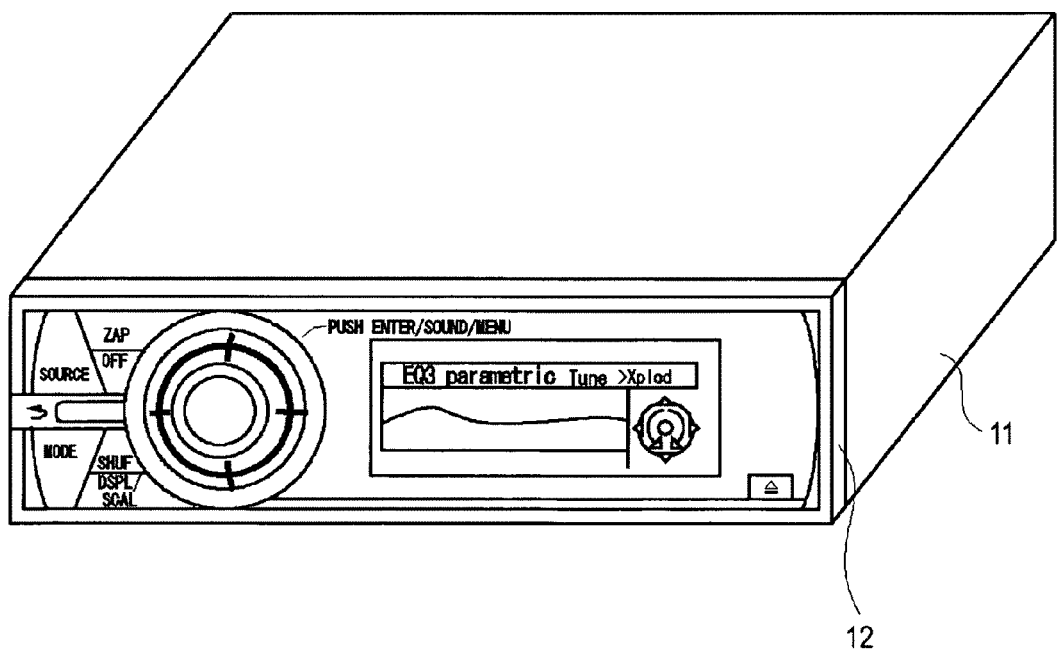
FIG. 4 shows a schematic diagram depicting the configuration of the appearance of a car audio system.

1. Embodiment
2. Other embodiments
1. Embodiment
1-1. Configuration of the Appearance of a Car Audio System In FIG. 4, 10 denotes a car audio system according to an embodiment of the invention, showing a structure in which a front panel 12 is mounted on the front side of a main unit 11.

When the car audio system 10 is installed in a vehicle, not shown, because of spatial restrictions of a car room, most of the main unit 11 is buried inside the dashboard, and only the front panel 12 is exposed outside.

Practically, the car audio system 10 is compliant with a so-called DIN size, configured to have a width of about 178 mm and a height of about 50 mm, and the front panel 12 can be removed from the main unit 11 as a theft-prevention measure.

1-2. Configuration of the Front Panel

As shown in FIG. 5, to a front surface 12A, the front panel 12 is in turn provided from the left side with a manipulation button group 13 for accepting user input manipulations, a rotary encoder 14, and a display 15 formed of a fluorescent lamp.

In addition, the car audio system 10 is provided with a disk slot 16 (depicted by a broken line) in the front upper part of the main unit 11 for installing a disk recording medium such as a CD (Compact Disc) and a DVD (Digital Versatile Disc). In addition, the disk slot 16 is exposed only when the front panel 12 is slid down toward the front side of the main unit 11, or when the front panel 12 is removed from the main unit 11.

In addition, on the front panel 12, an eject button is provided in the lower right end part of the front surface 12A for ejecting a disk recording medium installed in the disk slot 16 of the main unit 11.

In other words, when the eject button 17 is pressed down, the car audio system 10 slides the front panel 12 downward to expose the disk slot 16 for ejecting a disk recording medium from the disk slot 16.

The manipulation button group 13 has a source button 13A, a back button 13B, a zapping button 13C, an off button 13D, a browser button 13E, and a front panel release button 13F. The manipulation button group 13 has a mode select button 13G, a shuffle button 13H, and a display/scroll button 13I arranged.

The source button 13A is a button that switches between sources such as the radio receiver, CD, USB (Universal Serial Bus) device, and AUX (Auxiliary), in response to pressing down the button by a user. The back button 13B is a button that returns the screen representations on the display 15 to the previous one.

The zapping button 13C is a button that conducts a so-called zapping reproduction in which a plurality of contents to be reproduced is in turn reproduced for a few seconds from the beginning, for example. The off button 13D is a button that turns off the power supply of the car audio system 10 or end the source being currently selected.

The browser button 13E is a button that searches for a plurality of contents contained in the CD, USB device, and portable audio player for display. The front panel release button 13F is a button used when the front panel 12 is removed from the main unit 11.

The mode select button 13G is a button that switches between the FM band and the AM band when the source is the radio receiver, between play modes when the source is a portable music player, or between menu items for settings when sound settings are made, for example.

The shuffle button 13H is a button that shuffles the order to reproduce a plurality of contents contained in the CD, USB device, and portable audio player. The display/scroll button 13I is a button that changes items to be displayed on the display 15, or scrolls the screen on which the item is displayed.

On the other hand, as shown in FIG. 6, the rotary encoder 14 has a knob 14A cylindrically protruded and capable of making four dimensional input manipulations in an upward direction UD, downward direction DD, left direction LD, right direction RD, right rotation direction RRD, left rotation direction RLD, and pressing downward direction PD.

Therefore, because the rotary encoder 14 is capable of making four dimensional input manipulations to a single knob 14A in various directions, the user, who is driving the car, is allowed to instantaneously and easily make input manipulations.

As shown in FIG. 7, on the display 15 on the front panel 12, the source screen G11 is displayed in normally reproducing a content. On the source screen G11, a source icon 15A is displayed in the upper left end part, a tuner icon 15B is displayed in the upper center part, and a time indication area 15C is provided in the upper right end part for indicating the current time of day.

Figure 8A:
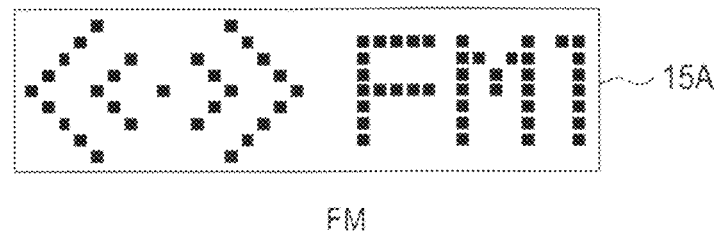
FIGS. 8A to 8C show schematic diagrams depicting source icons.
Figure 8B:
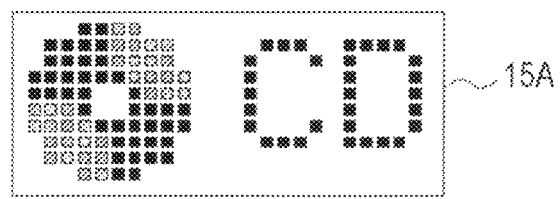
Figure 8C:
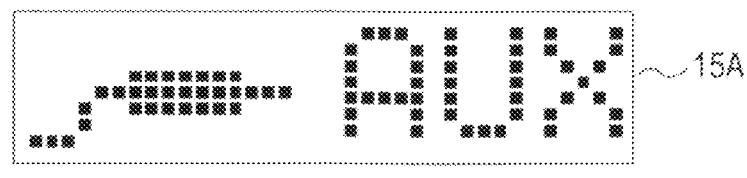

The source icon 15A is displayed when an MP3 (MPEG Audio Layer-3) content stored in a USB device is selected, and in addition to this, as shown in FIGS. 8A to 8C, the source icon 15A displays the selection state of the FM radio receiver, CD, and AUX.

In addition, on the source screen G11, a text indication area 15D is provided in almost the center part for indicating an artist name and music title, and a folder track indication area 15E is provided in the end lower left part for indicating the folder number and track number of the content being reproduced.

On the display 15, an elapsed time indication area 15F is provided in the lower right end part for indicating the elapsed time to reproduce the content being reproduced.

1-3. Circuitry Configurations of the Car Audio System

Because the car audio system 10 is configured of the main unit 11 and the front panel 12, the circuitry configurations of the main unit 11 and the front panel 12 will be described with reference to FIG. 9.

In the front panel 12, a display microcomputer 20 formed of a CPU (Central Processing Unit) conducts centralized control overall, and controls display details on the display 15.

In addition, the front panel 12 accepts an instruction made by the user pressing down the manipulation button group 13 through the display microcomputer 20, and outputs the instruction to a manipulation detecting unit 31 of the main unit 11.

On the other hand, the front panel 12 directly outputs an instruction made by a user input manipulation to the rotary encoder 14 to the manipulation detecting unit 31 of the main unit 11, as bypasses the display microcomputer 20.

In the main unit 11, a system control microcomputer 30 formed of a CPU conducts centralized control overall, and the system control microcomputer 30 recognizes an instruction made by the user based on the result detected by the manipulation detecting unit 31.

The system control microcomputer 30 of the main unit is capable of controlling the details to be displayed on the display 15 through the display microcomputer 20 of the front panel 12 in accordance with the instruction.

In addition, the system control microcomputer 30 of the main unit 11 controls the volume level of output sounds by an electronic volume adjustment 33 through an electronic volume adjustment controller 32 in accordance with the instruction.

The system control microcomputer 30 of the main unit 11 controls reproduction processing for the FM radio receiver, CD, and USB device, (not shown) in accordance with the instruction, and outputs the reproduction results to speakers mounted on the vehicle.

1-4. Controlling the Equalizer

Next, screen transitions will be described more specifically with reference to (A) to (C) in FIG. 10 when the system control microcomputer 30 of the main unit 11 conducts a sound setting process (controlling the equalizer) through the display microcomputer 20 of the front panel 12 in the car audio system 10.

Figure 10:
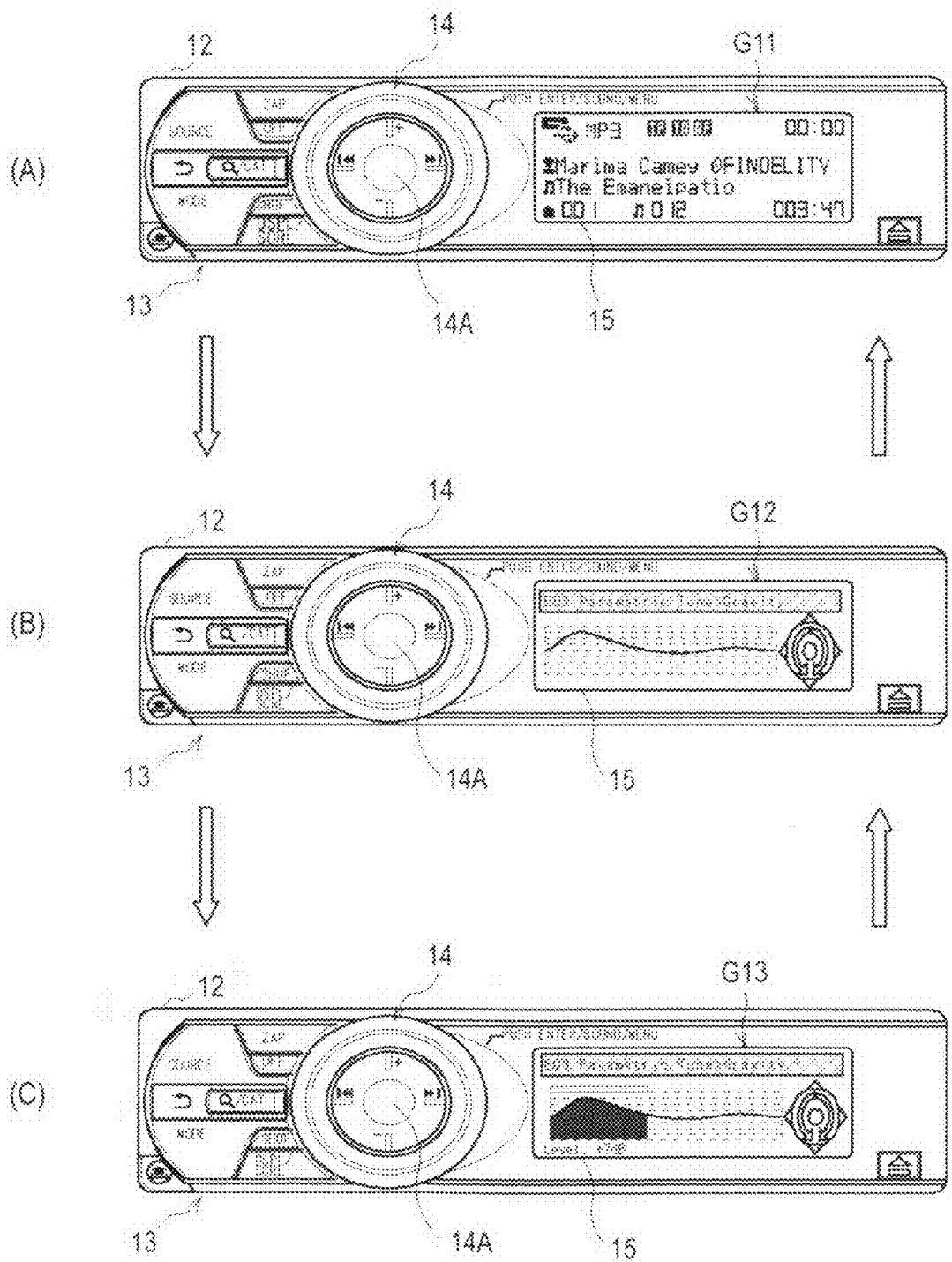
FIG. 10 shows schematic diagrams depicting an equalizer setting method according to an embodiment of the invention.

Practically, when the car audio system 10 recognizes that the knob 14A of the rotary encoder 14 is pressed down in the pressing downward direction PD (FIG. 6) during the source screen G11 (FIG. 7) being displayed on the display 15 as shown in (A) in FIG. 10, the car audio system 10 conducts the following screen transitions.

At this time, the system control microcomputer 30 of the main unit 11 switches the screen from the source screen G11 ((A) in FIG. 10) being displayed on the display 15 to a sound menu screen G12 ((B) in FIG. 10) through the display microcomputer 20 of the front panel 12.

The sound menu screen G12 is used to allow the user to select any one of menu items such as "equalizer control (EQ3 Parametric Tune>Gravity)", "subwoofer control (not shown)

", "highpass filter control (not shown)", and "fader/balance control (not shown)", when the user makes sound settings.

In response to the user rotating the knob 14A of the rotary encoder 14, the system control microcomputer 30 of the main unit 11 in turn switches focus on the menu items such as "equalizer control (EQ3 Parametric Tune>Gravity)", "subwoofer control", "highpass filter control", and "fader/balance control".

The sound menu screen G12 shows the state in which the menu item "equalizer control (EQ3 Parametric Tune >Gravity)" is focused, and the other menu items "subwoofer control", "highpass filter control", and "fader/balance control" are not displayed.

Among the menu items, when the system control microcomputer 30 of the main unit 11 recognizes that the knob 14A is pressed down in the pressing downward direction PD (FIG. 6) as the menu item "equalizer control", for example, is focused in response to the user rotating the knob 14A of the rotary encoder 14, the car audio system 10 conducts the following screen transitions.

In this case, the system control microcomputer 30 of the main unit 11 switches the screen from the sound menu screen G12 ((B) in FIG. 10) being displayed on the display 15 to an equalizer control screen G13 ((C) in FIG. 10) through the display microcomputer 20 of the front panel 12.

The equalizer control screen G13 is capable of conducting all of menu items "select the band", "select the center frequency and Q" and "adjust the level", which are related to "equalizer control", on this single screen.

Figure 11:
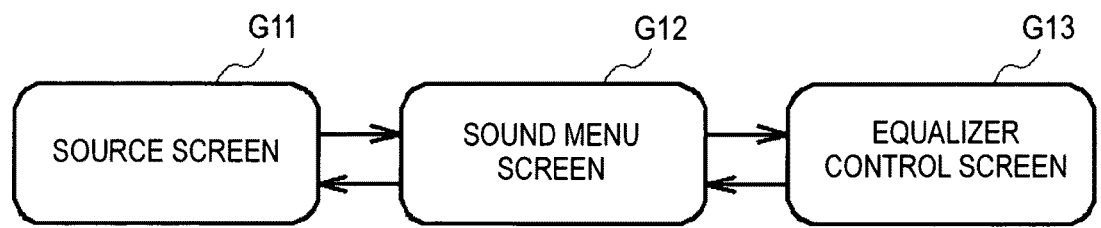
FIG. 11 shows a schematic diagram depicting screen transitions (1) according to an embodiment of the invention.

In other words, as shown in FIG. 11, in the car audio system 10, the screens are changed from the source screen G11 to the sound menu screen G12, and then to the equalizer control screen G13, and all of menu items "band selection mode", "center frequency and Q selection mode", and "level adjustment mode" can be conducted on the equalizer control screen G13.

Figure 1:
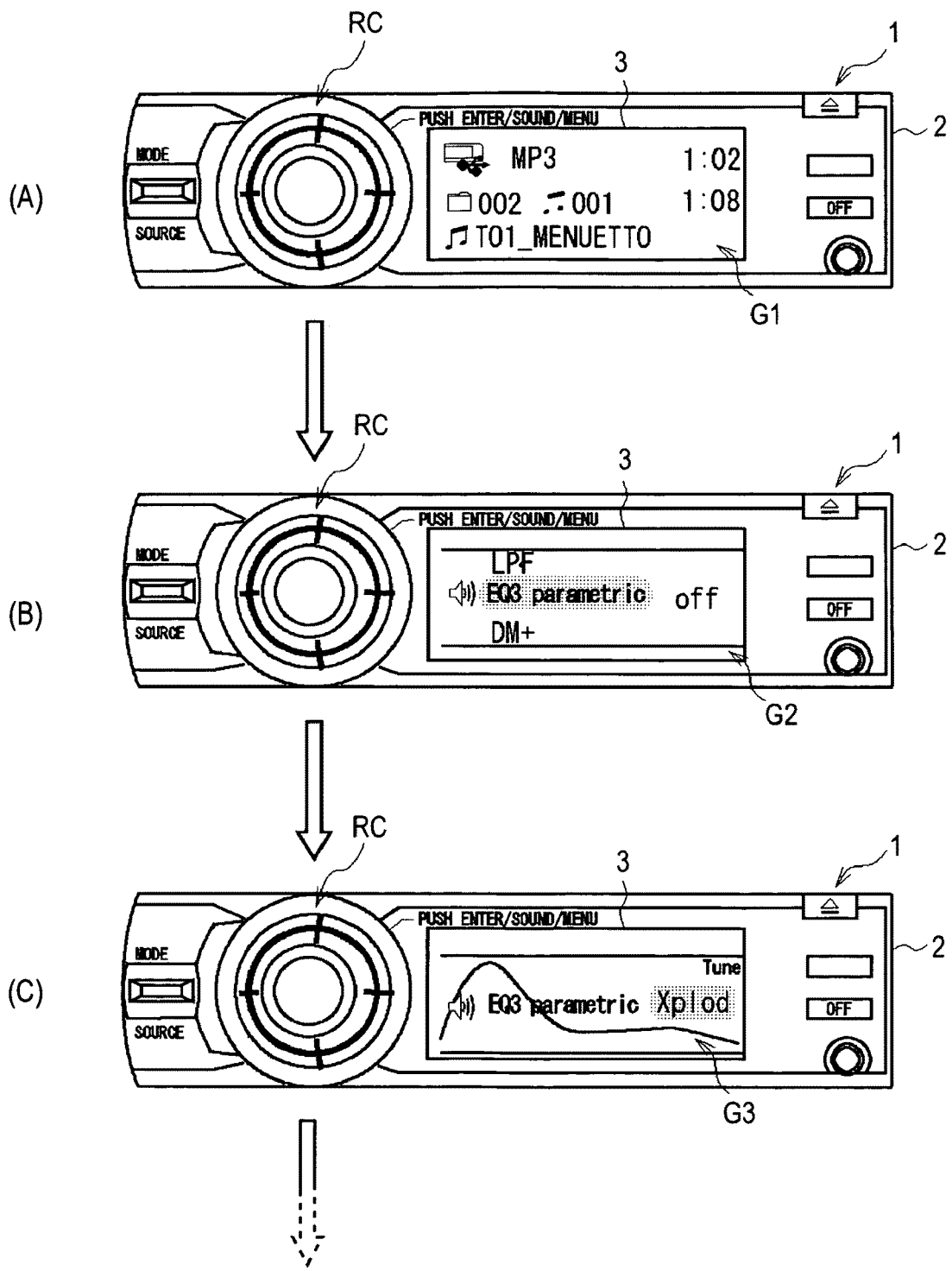
FIG. 1 shows schematic diagrams depicting an equalizer setting method before (1)
Figure 2:
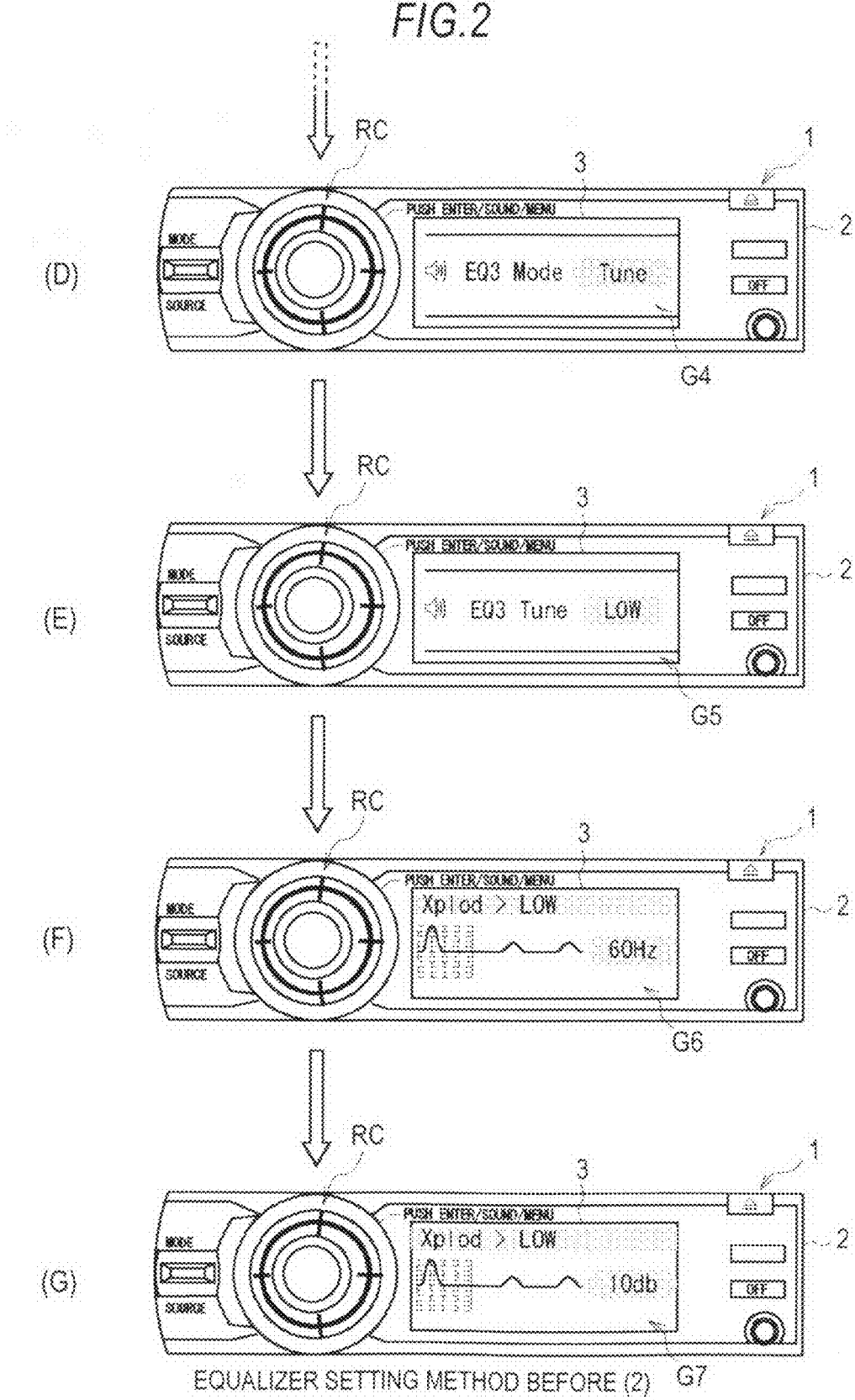
FIG. 2 shows schematic diagrams depicting the equalizer setting method before (2)
Figure 3:
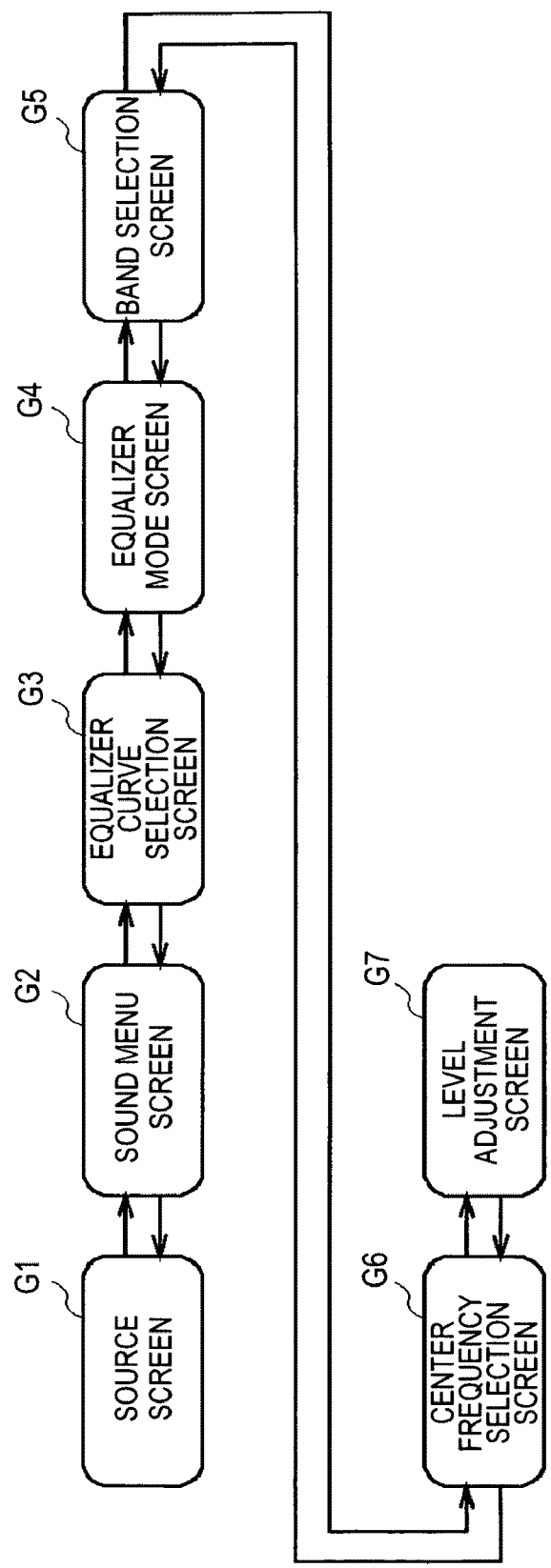
FIG. 3 shows a schematic diagram depicting screen transitions before.

In the screen transitions before (FIG. 3), it is necessary to conduct the items "select the band", "select the center frequency" and "adjust the level" in each layer, while the individual layers are in turn passed from the source screen G1 to the level adjustment screen G7.

However, in the car audio system 10 according to the embodiment of the invention, all of "the band selection mode", "the center frequency and Q selection mode", and "the level adjustment mode" can be conducted on a single layer screen, on the equalizer control screen G13 (FIG. 11).

In addition, in the car audio system 10, screens are changed from the source screen G11 to the sound menu screen G12, and to the equalizer control screen G13, in response to pressing down the knob 14A of the rotary encoder 14 in the pressing downward direction PD (FIG. 6) and pressing down the back button 13B.

Figure 12:
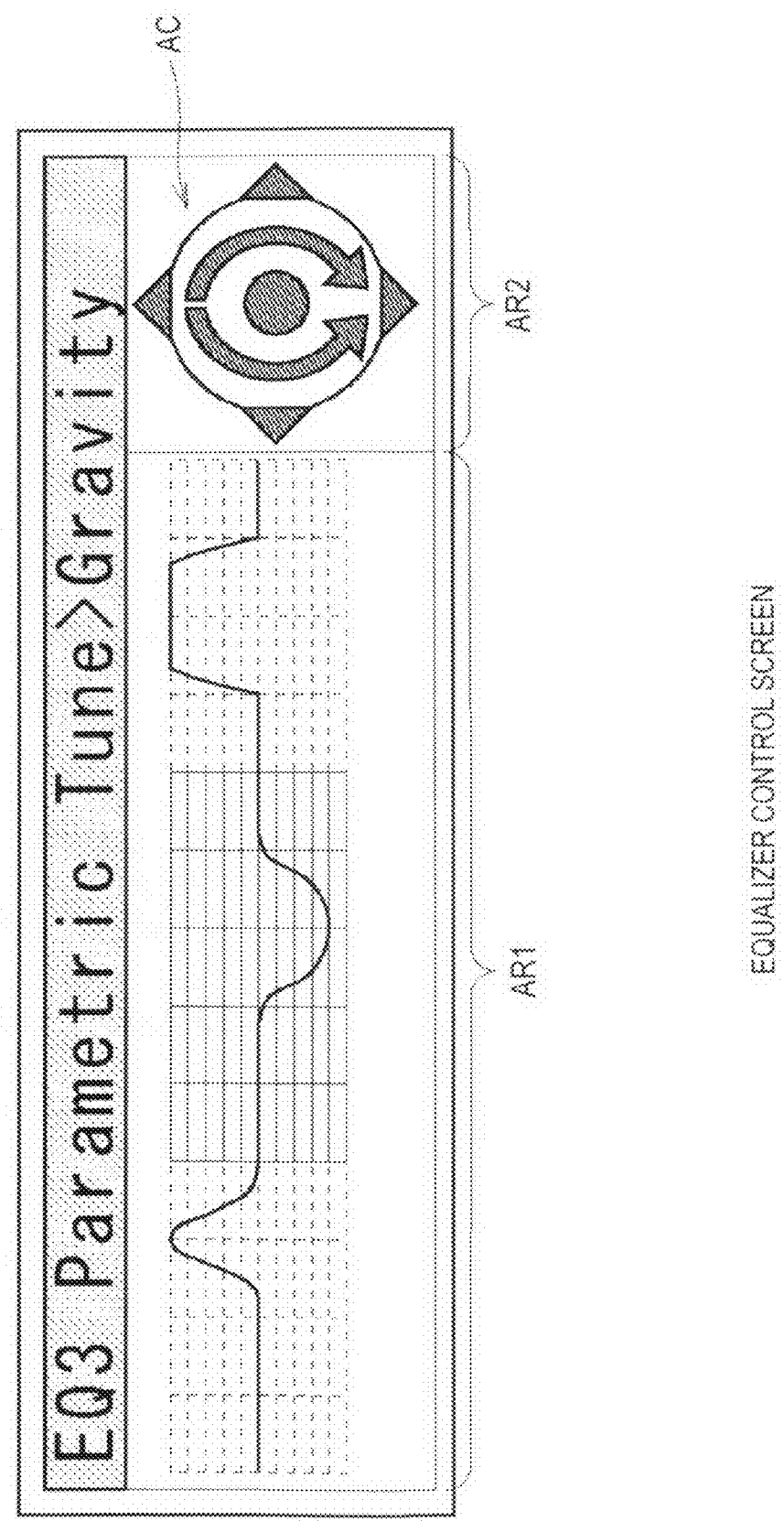
FIG. 12 shows a schematic diagram depicting an equalizer control screen.

As shown in FIG. 12, the equalizer control screen G13 is provided with an equalizer control area AR1 (described later) for controlling the equalizer on the screen and a manipulation guide area AR2 for guiding the user to directions to manipulate the knob 14A of the rotary encoder 14.

In the manipulation guide area AR2, a manipulation icon AC is displayed for more specifically guiding the user to directions to manipulate the knob 14A of the rotary encoder 14, which presents operable directions when input manipulations are made through the rotary encoder 14 at that point in time.

Figure 13:
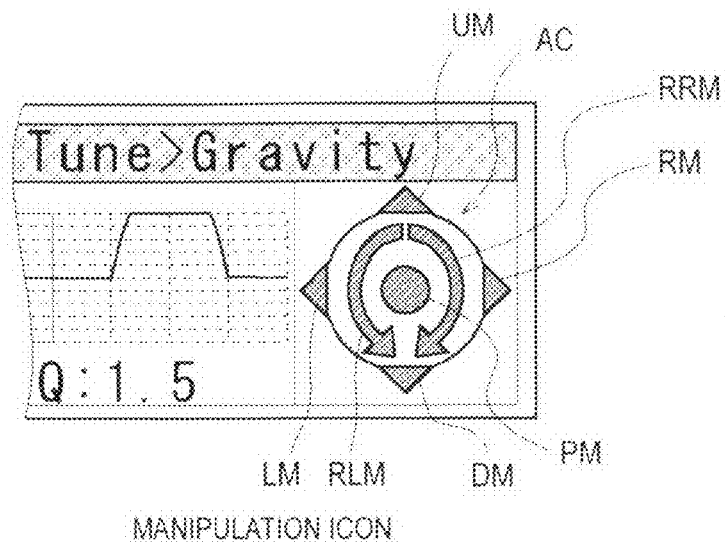
FIG. 13 shows a schematic diagram depicting a manipulation icon.

More specifically, as shown in FIG. 13, the manipulation icon AC is a pattern that copies the rotary encoder 14. In the car audio system 10, the user is allowed to visually recognize the manipulation icon AC, whereby the user is guided to the input direction.

The manipulation icon AC is provided with an upward direction mark UM indicating that an input manipulation is operable in the upward direction, a downward direction mark DM indicating that an input manipulation is operable in the downward direction, a right direction mark RM indicating that an input manipulation is operable in the right direction, and a left direction mark LM indicating that an input manipulation is operable in the left direction, and these marks are lit as necessary.

In addition, the manipulation icon AC is provided with a right rotation direction mark RRM indicating that an input manipulation is operable in the right rotation direction, a left rotation direction mark RLM indicating that an input manipulation is operable in the left rotation direction, and a pressing downward direction mark PM indicating that an input manipulation is operable in the pressing downward direction PD (FIG. 6), and these marks are lit as necessary.

Figure 14A:
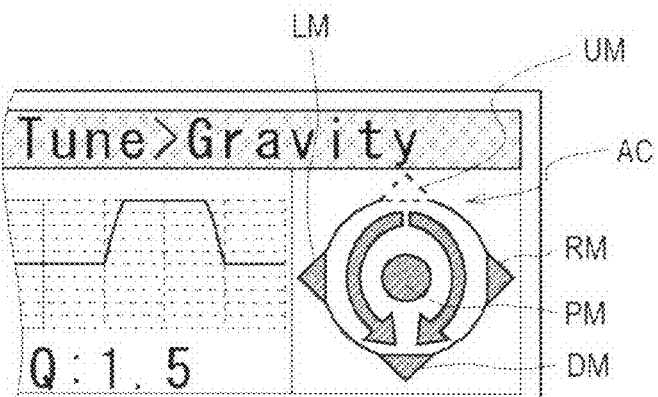
FIGS. 14A and 14B show schematic diagrams depicting the cases in which the manipulation icon is inoperable in the upward and downward directions.

For example, as shown in FIG. 14A, the system control microcomputer 30 switches off only the upward direction mark UM of the manipulation icon AC when an input manipulation in the upward direction UD is inoperable in the rotary encoder 14, and tells that input manipulations in the other directions except that are operable.

Figure 14B:
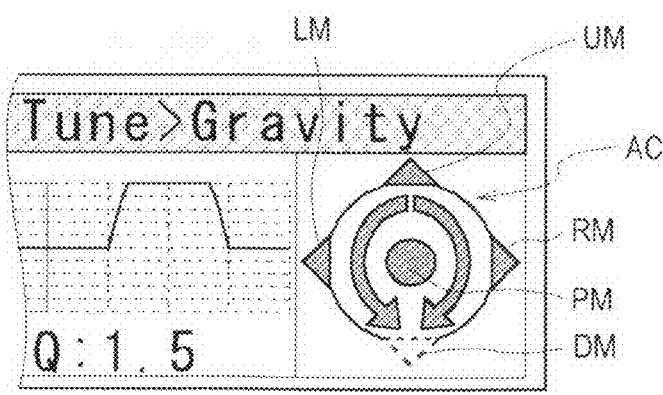

As shown in FIG. 14B, the system control microcomputer 30 switches off only the downward direction mark DM of the manipulation icon AC when an input manipulation in the downward direction DD is inoperable in the rotary encoder 14, and tells that input manipulations in the other directions except that are operable.

Figure 15A:
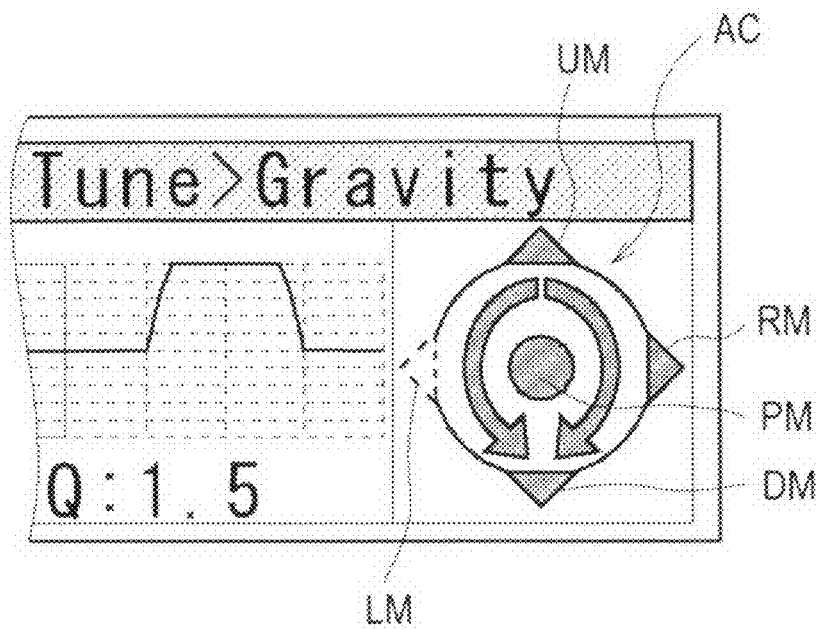
FIGS. 15A and 15B show schematic diagrams depicting the cases in which the manipulation icon is inoperable in the left and right directions.

In addition, as shown in FIG. 15A, the system control microcomputer 30 switches off only the left direction mark LM of the manipulation icon AC when an input manipulation in the left direction LD is inoperable in the rotary encoder 14, and tells that input manipulations in the other directions except that are operable.

Figure 15B:
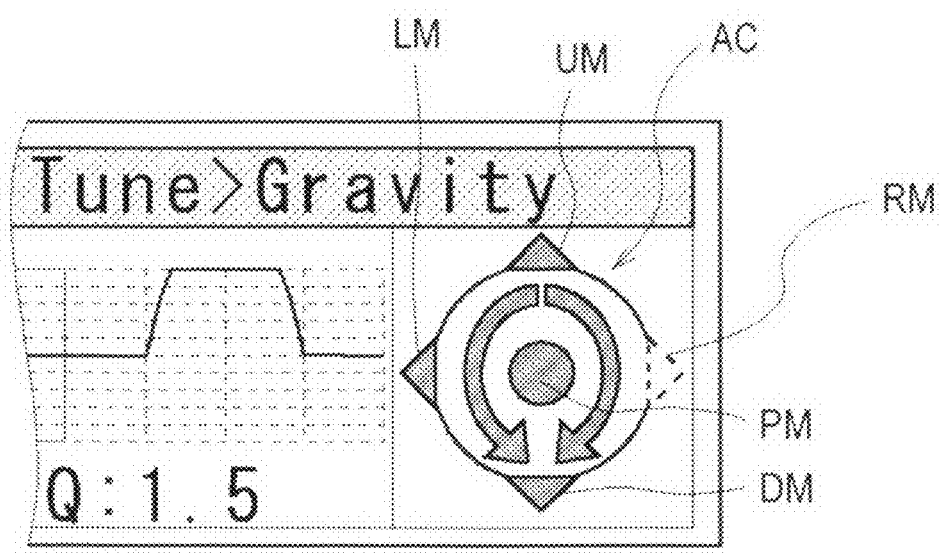

As shown in FIG. 15B, the system control microcomputer 30 switches off only the right direction mark RM of the manipulation icon AC when an input manipulation in the right direction RD is inoperable, and tells that input manipulations in the other directions except that are operable.

Figure 16A:
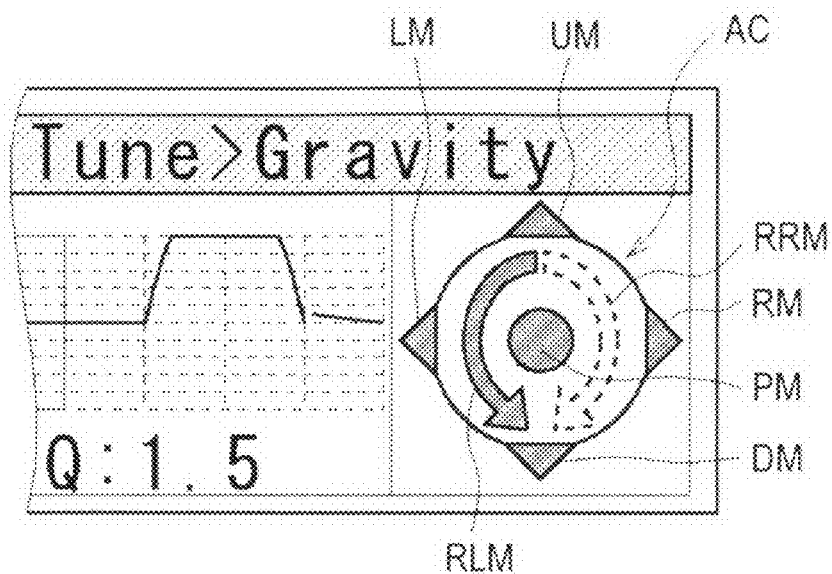
FIGS. 16A and 16B show schematic diagrams depicting the cases in which the manipulation icon is inoperable in the rotation direction.

As shown in FIG. 16A, the system control microcomputer 30 switches off only the right rotation direction mark RRM of the manipulation icon AC when an input manipulation in the right rotation direction RRD is inoperable in the rotary encoder 14, and tells that input manipulations in the other directions except that are operable.

Figure 16B:
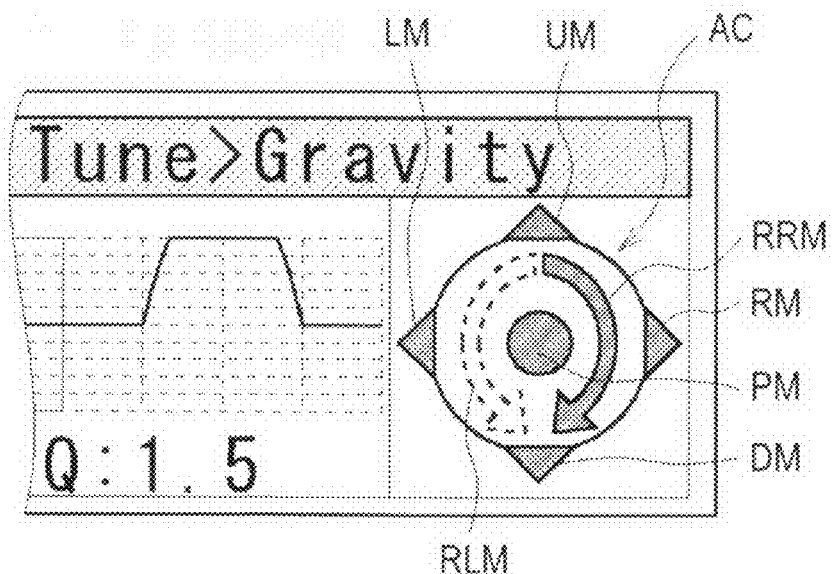

As shown in FIG. 16B, the system control microcomputer 30 switches off only the left rotation direction mark RLM of the manipulation icon AC when an input manipulation in the left rotation direction RLD is inoperable in the rotary encoder 14, and tells that input manipulations in the other directions except that are operable.

On the other hand, in the equalizer control area AR1 (FIG. 12), the menu items "band selection mode", "center frequency and Q selection mode", and "level adjustment mode" in controlling the equalizer are all displayed as well as the selected results and adjusted results so far are all displayed and reflected in the result of controlling the equalizer.

1-4-1. Mode Transitions and Screen Transitions in Controlling the Equalizer

Figure 17:
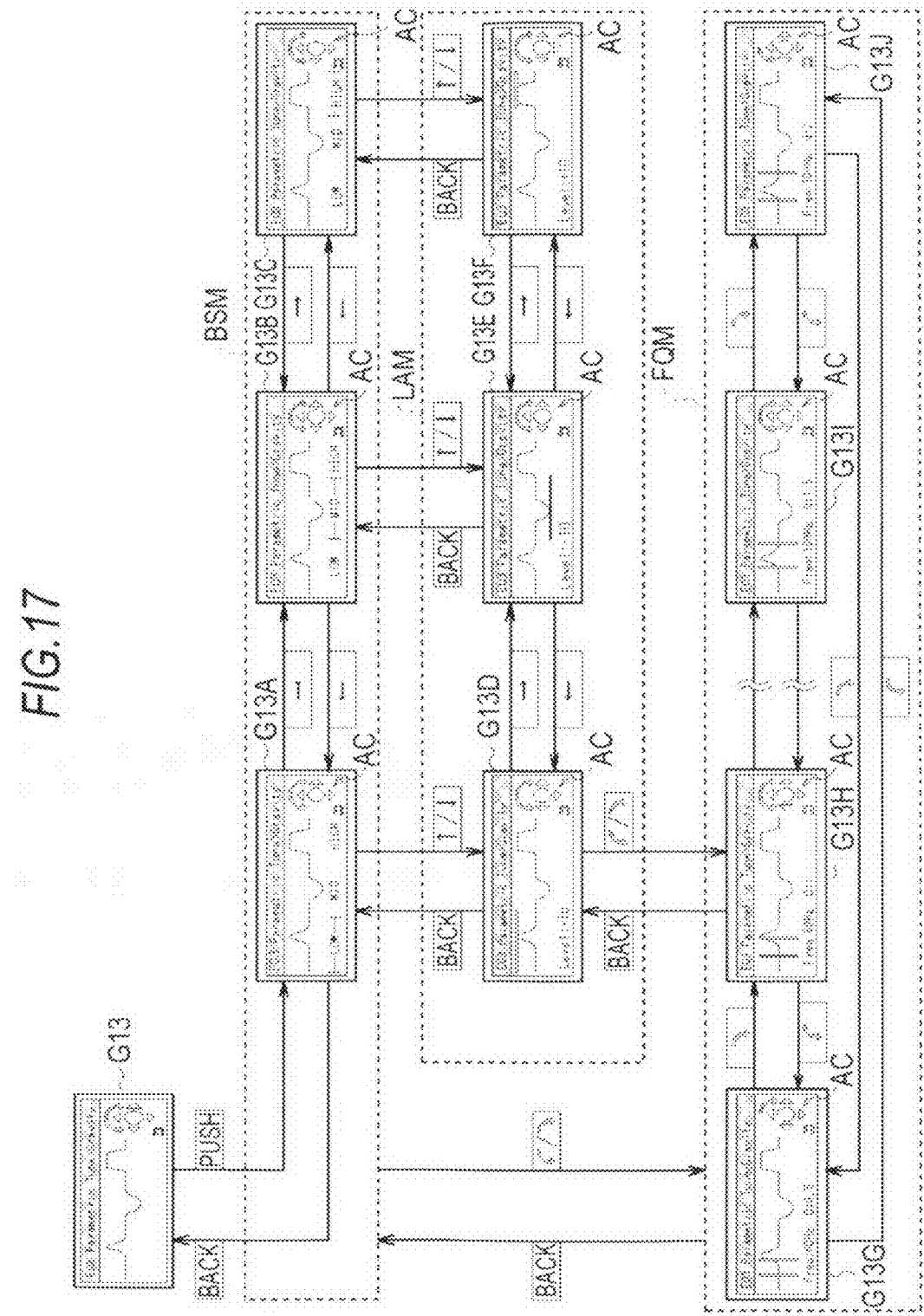
FIG. 17 shows a schematic diagram illustrative of mode transitions and screen transitions in controlling an equalizer.

More specifically, as shown in FIG. 17, when the knob 14A of the rotary encoder 14 is pressed down in the pressing downward direction PD (FIG. 6) on the equalizer control screen G13, the system control microcomputer 30 of the main unit 11 changes the mode to the band selection mode BSM.

In the band selection mode BSM, any one of frequency bands "LOW", "MID", and "HIGH" is selected for adjustment by the equalizer. In other words, the system control microcomputer 30 switches the screen among equalizer control screens G13A, G13B and G13C, in response to making an input manipulation to the knob 14A of the rotary encoder 14 in the left direction LD or in the right direction RD.

The equalizer control screen G13A shows the state in which the frequency band "LOW" is selected for adjustment by the equalizer, and the equalizer control screen G13B shows the state in which the frequency band "MID" is selected for adjustment by the equalizer. In addition, the equalizer control screen G13C shows the state in which the frequency band "HIGH" is selected for adjustment by the equalizer.

Therefore, the system control microcomputer 30 of the main unit 11 can select the frequency band desired by the user in response to making an input manipulation to the knob 14A of the rotary encoder 14 in the right direction RD or in the left direction LD, and presents the result on the equalizer control screen G13A, G13B or G13C.

In addition, when the frequency band "LOW" is selected on the equalizer control screen G13A, the system control microcomputer 30 switches off the left direction mark LM of the manipulation icon AC (FIG. 15A) because an input manipulation is inoperable to the knob 14A of the rotary encoder 14 in the left direction LD.

In addition, when the frequency band "MID" is selected on the equalizer control screen G13B, the system control microcomputer 30 switches on all the directions because input manipulations are operable to the knob 14A of the rotary encoder 14 in all the directions.

Furthermore, when the frequency band "HIGH" is selected on the equalizer control screen G13C, the system control microcomputer 30 switches off the right direction mark RM of the manipulation icon AC (FIG. 15B) because an input manipulation is inoperable to the knob 14A of the rotary encoder 14 in the right direction RD.

When an input manipulation is made to the knob 14A of the rotary encoder 14 in the upward direction UD or in the downward direction DD on the equalizer control screens G13A, G13B, and G13C, the system control microcomputer 30 of the main unit 11 changes the mode to the level adjustment mode LAM.

In the level adjustment mode LAM, the output level can be changed from −10 dB to +10 dB at the maximum for each of the frequency bands "LOW", "MID", and "HIGH".

Practically, the system control microcomputer 30 adjusts the output level through equalizer control screens G13D, G13E and G13F in response to making an input manipulation to the knob 14A of the rotary encoder 14 in the upward direction UD or in the downward direction DD, and displays the adjusted result.

The equalizer control screen G13D shows the state in which the output level is set to +10 dB in the frequency band "LOW", and the equalizer control screen G13E shows the state in which the output level is set to −10 dB in the frequency band "MID". In addition, the equalizer control screen G13F shows the state in which the output level is set to +10 dB in the frequency band "HIGH".

In addition, also in the level adjustment mode LAM, the system control microcomputer 30 switches the screen among the equalizer control screens G13D, G13E and G13F, in response to making an input manipulation to the knob 14A of the rotary encoder 14 in the left direction LD or in the right direction RD.

In addition, in the case of the equalizer control screen G13D, because the output level is set to +10 dB at the maximum level in the frequency band "LOW", an input manipulation is inoperable to the knob 14A of the rotary encoder 14 in the upward direction UD. Therefore, the system control microcomputer 30 switches off the upward direction mark UM of the manipulation icon AC (FIG. 14A).

In addition, in the case of the equalizer control screen G13E, because the output level is set to −10 dB at the maximum level in the frequency band "MID", an input manipulation is inoperable to the knob 14A of the rotary encoder 14 in the downward direction DD. Therefore, the system control microcomputer 30 switches off the downward direction mark DM of the manipulation icon AC.

Furthermore, in the case of the equalizer control screen G13F, because the output level is set to +10 dB at the maximum level in the frequency band "HIGH", an input manipulation is inoperable to the knob 14A of the rotary encoder 14 in the upward direction UD. Therefore, the system control microcomputer 30 switches off the upward direction mark UM of the manipulation icon AC (FIG. 14A).

When an input manipulation is made to the knob 14A of the rotary encoder 14 in the right rotation direction RRD or in the left rotation direction RLD on the equalizer control screens G13D, G13E, and G13F, the system control microcomputer of the main unit 11 changes the mode to the center frequency and Q selection mode FQM.

In the center frequency and Q selection mode FQM, the user is allowed to select the center frequency and Q for each of the frequency bands "LOW", "MID", and "HIGH". Here, the term "Q" means the sharpness of output waveforms (the sharpness of resonance).

Equalizer control screens G13G, G13H, G13I and G13J in the center frequency and Q selection mode FQM are examples when the screen is changed from the equalizer control screen G13D corresponding to the frequency band "LOW".

In the frequency band "LOW", the center frequency is selected between 60 Hz and 100 Hz, for example, as well as Q is selected from "0.5", "1.0", "1.5" and "2.0", for example. In addition, similarly, also in the frequency band "MID" and the frequency band "HIGH", the center frequency and Q are selected from a plurality of candidates.

Practically, the system control microcomputer 30 selects the center frequency and Q in the frequency band "LOW", in response to making an input manipulation to the knob 14A of the rotary encoder 14 in the right rotation direction RRD or in the left rotation direction RLD.

The system control microcomputer 30 displays the selected results of the center frequency and Q in the frequency band "LOW" through the equalizer control screen G13G, G13H, G13I and G13J, for example.

The equalizer control screen G13G shows the state in which the center frequency is set to 60 Hz and Q is set to "0.5" in the frequency band "LOW". In addition, the equalizer control screen G13H shows the state in which the center frequency is set to 60 Hz and Q is set to "1.0" in the frequency band "LOW".

Similarly, the equalizer control screen G13I shows the state in which the center frequency is set to 100 Hz and Q is set to "1.5" in the frequency band "LOW". In addition, the equalizer control screen G13J shows the state in which the center frequency is set to 100 Hz and Q is set to "2.0" in the frequency band "LOW".

Although the equalizer control screens G13G to G13J are used to set the center frequency and Q in the frequency band "LOW", similarly, there are equalizer control screens (not shown) used to set the center frequency and Q in the frequency bands "MID" and "HIGH".

In addition, also in the center frequency and Q selection mode FQM, the system control microcomputer 30 switches the screen among the frequency bands "LOW", "MID", and "HIGH" when the center frequency and Q are selected, in response to making an input manipulation to the knob 14A of the rotary encoder 14 in the left direction LD or in the right direction RD.

In the case of the equalizer control screen G13G, the center frequency is set to 60 Hz and Q is set to "0.5" in the frequency band "LOW", and an input manipulation is inoperable to the knob 14A of the rotary encoder 14 in the left rotation direction RLD. Therefore, the system control microcomputer 30 switches off the left rotation direction mark RLM of the manipulation icon AC (FIG. 16B).

In addition, in the case of the equalizer control screen G13H, the center frequency is set to 60 Hz and Q is set to "1.0" in the frequency band "LOW", and input manipulations are operable to the knob 14A of the rotary encoder 14 in all the directions. Therefore, the system control microcomputer 30 switches on all the marks of the manipulation icon AC.

Also in the case of the equalizer control screen G13I, the center frequency is set to 100 Hz and Q is set to "1.5" in the frequency band "LOW", and input manipulations are operable to the knob 14A of the rotary encoder 14 in all the directions. Therefore, the system control microcomputer 30 switches on all the marks of the manipulation icon AC.

Furthermore, in the case of the equalizer control screen G13J, the center frequency is set to 100 Hz and Q is set to "2.0" in the frequency band "LOW", and an input manipulation is inoperable to the knob 14A of the rotary encoder 14 in the right rotation direction RRD. Therefore, the system control microcomputer 30 switches off the right rotation direction mark RRM of the manipulation icon AC (FIG. 16A).

In addition, the system control microcomputer 30 can change the mode from the level adjustment mode LAM to the center frequency and Q selection mode FQM as described above, as well as can directly change the mode from the band selection mode BSM to the center frequency and Q selection mode FQM.

Practically, when an input manipulation is made to the knob 14A of the rotary encoder 14 in the right rotation direction RRD or in the left rotation direction RLD on the equalizer control screens 13A, 13B, and 13C in the band selection mode BSM, the system control microcomputer 30 directly changes the mode to the center frequency and Q selection mode FQM.

Particularly, when an input manipulation is made to the knob 14A of the rotary encoder 14 in the right rotation direction RRD or in the left rotation direction RLD on the equalizer control screen 13A, the system control microcomputer 30 changes the mode to the center frequency and Q selection mode FQM corresponding to the frequency band "LOW".

In addition, when an input manipulation is made to the knob 14A of the rotary encoder 14 in the right rotation direction RRD or in the left rotation direction RLD on the equalizer control screen 13B, the system control microcomputer 30 changes the mode to the center frequency and Q selection mode FQM corresponding to the frequency band "MID".

Furthermore, when an input manipulation is made to the knob 14A of the rotary encoder 14 in the right rotation direction RRD or in the left rotation direction RLD on the equalizer control screen 13C, the system control microcomputer 30 changes the mode to the center frequency and Q selection mode FQM corresponding to the frequency band "HIGH".

As described above, the system control microcomputer 30 can change the mode among the band selection mode BSM, the level adjustment mode LAM, and the center frequency and Q selection mode FQM on the equalizer control screen G13, and can control the equalizer in the individual modes.

As described above, because the system control microcomputer 30 displays the selected results and adjusted results in the individual modes as reflecting these results on the equalizer control screen G13 all the time, the system control microcomputer 30 allows the user to control the equalizer while the user visually recognizes the selected results and adjusted results before without returning the screen to previous ones. In addition, such a scheme may be possible that the system control microcomputer 30 forcedly returns the screen to the equalizer control screen G13 when the back button 13B of the manipulation button group 13 is pressed down in any one of the band selection mode BSM, the level adjustment mode LAM, and the center frequency and Q selection mode FQM.

1-5. Controlling the Subwoofer

Next, screen transitions when the system control microcomputer 30 of the main unit 11 conducts a sound setting process (controlling the subwoofer) through the display microcomputer 20 of the front panel 12 in the car audio system 10 will be described more specifically with reference to (A) to (C) in FIG. 18.

Figure 18:
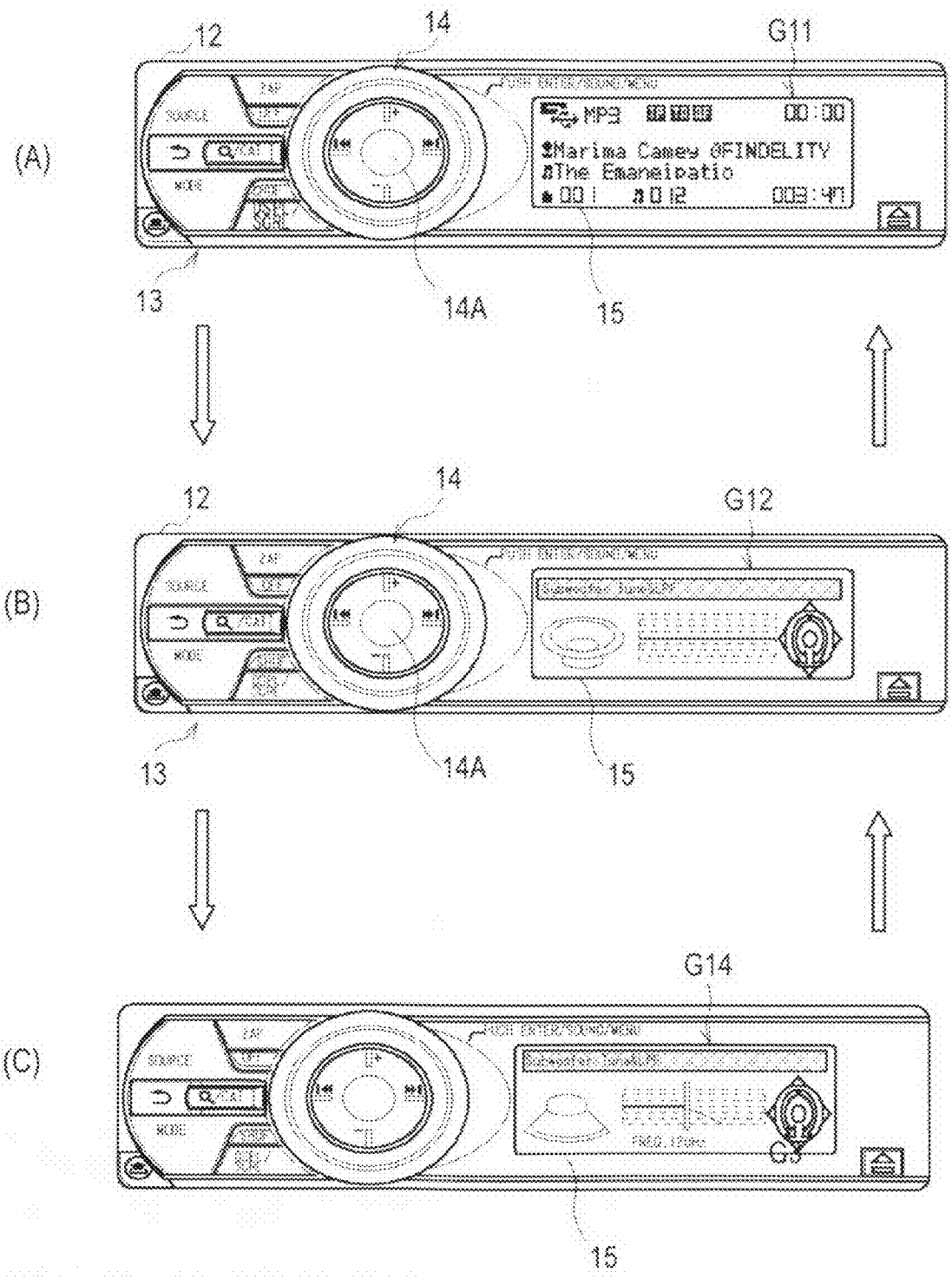
FIG. 18 shows schematic diagrams depicting a subwoofer setting method according to an embodiment of the invention.

Practically, as shown in (A) in FIG. 18, during the source screen G11 (FIG. 7) being displayed on the display 15, when the car audio system 10 recognizes that the knob 14A of the rotary encoder 14 is pressed down in the pressing downward direction PD (FIG. 6), the car audio system 10 conducts the following screen transitions.

At this time, the system control microcomputer 30 of the main unit 11 switches the screen from the source screen G11 ((A) in FIG. 18) being displayed on the display 15 to the sound menu screen G12 ((B) in FIG. 18) through the display microcomputer 20 of the front panel 12.

The sound menu screen G12 is used to allow the user to select any one of menu items such as "equalizer control (not shown)", "subwoofer control (Subwoofer Tune & LPF)", "highpass filter control (not shown)", and "fader/balance control (not shown)" when the user makes sound settings.

The system control microcomputer 30 of the main unit 11 in turn switches focus on the menu items such as "equalizer control", "subwoofer control (Subwoofer Tune & LPF)", "highpass filter control", and "fader/balance control", in response to the user rotating the knob 14A of the rotary encoder 14.

The sound menu screen G12 shows the state in which the menu item "subwoofer control (Subwoofer Tune & LPF)" is focused, and the other menu items "equalizer control", "highpass filter control", and "fader/balance control" are not displayed.

When the system control microcomputer 30 of the main unit 11 recognizes that the knob 14A is pressed down in the pressing downward direction PD (FIG. 6) in the state in which the menu item "subwoofer control (Sub woofer Tune & LPF) ", for example, is focused by the user rotating the knob 14A of the rotary encoder 14 among the menu items, the car audio system 10 conducts the following screen transitions.

In this case, the system control microcomputer 30 of the main unit 11 switches the screen from the sound menu screen G12 ((B) in FIG. 18) being displayed on the display 15 to a subwoofer control screen G14 ((C) in FIG. 18) through the display microcomputer 20 of the front panel 12.

Also on the subwoofer control screen G14 ((C) in FIG. 18), menu items "normal/reverse selection mode", "cutoff frequency selection mode", and "level adjustment mode" related to "subwoofer control" can be conducted on this single screen.

Figure 19:
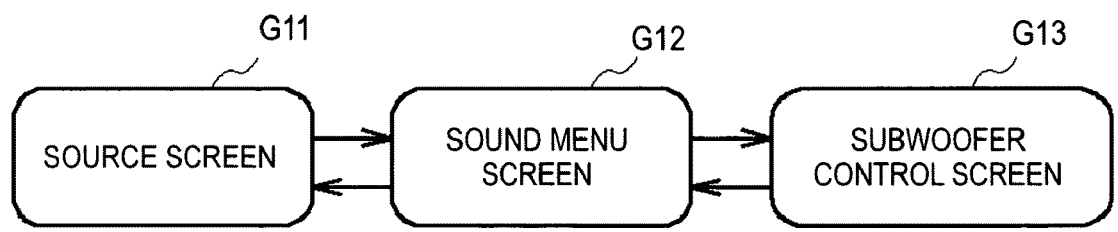
FIG. 19 shows a schematic diagram depicting screen transitions (2) according to an embodiment of the invention.

In other words, as shown in FIG. 19, in the car audio system 10, the screens are changed from the source screen G11 to the sound menu screen G12, and then to the subwoofer control screen G14, and the menu items "normal/reverse selection mode", "cutoff frequency selection mode", and "level adjustment mode" can be all conducted on a single layer on the subwoofer control screen G14.

In addition, in the car audio system 10, the screens are changed among the source screen G11, the sound menu screen G12, and the subwoofer control screen G14, in response to pressing down the knob 14A of the rotary encoder 14 in the pressing downward direction PD (FIG. 6) and the back button 13B.

Figure 20:
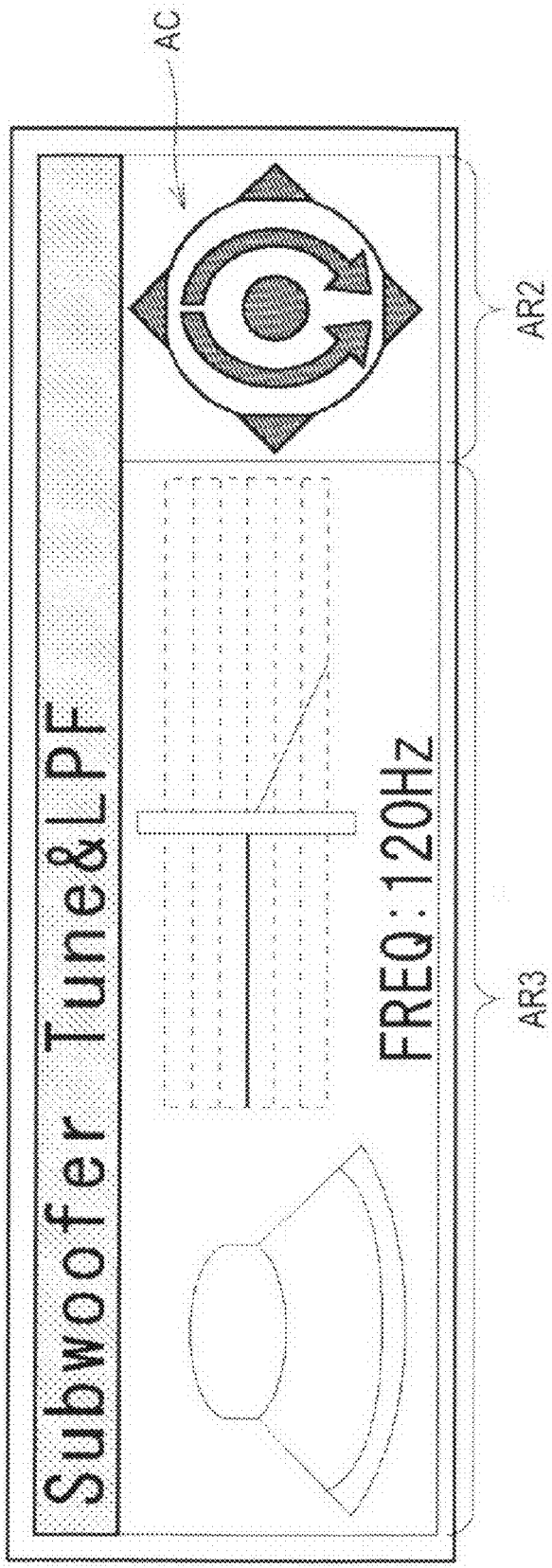
FIG. 20 shows a schematic diagram depicting a subwoofer control screen.

As shown in FIG. 20, the subwoofer control screen G14 is provided with a subwoofer control area AR3 (described later) for controlling the subwoofer on the screen and a manipulation guide area AR2 for guiding the user to directions to manipulate the rotary encoder 14.

In the manipulation guide area AR2, a manipulation icon AC is displayed for more specifically guiding the user to directions to manipulate the knob 14A of the rotary encoder 14, which presents operable directions to manipulate the rotary commander 14 at that point in time.

As described above in FIGS. 13 to 16B, the manipulation icon AC here is a pattern that copies the rotary encoder 14, and the user is allowed to visually recognize the manipulation icon AC, whereby the user is guided to the input direction.

1-5-1. Mode Transitions and Screen Transitions in Controlling the Subwoofer

Figure 21:
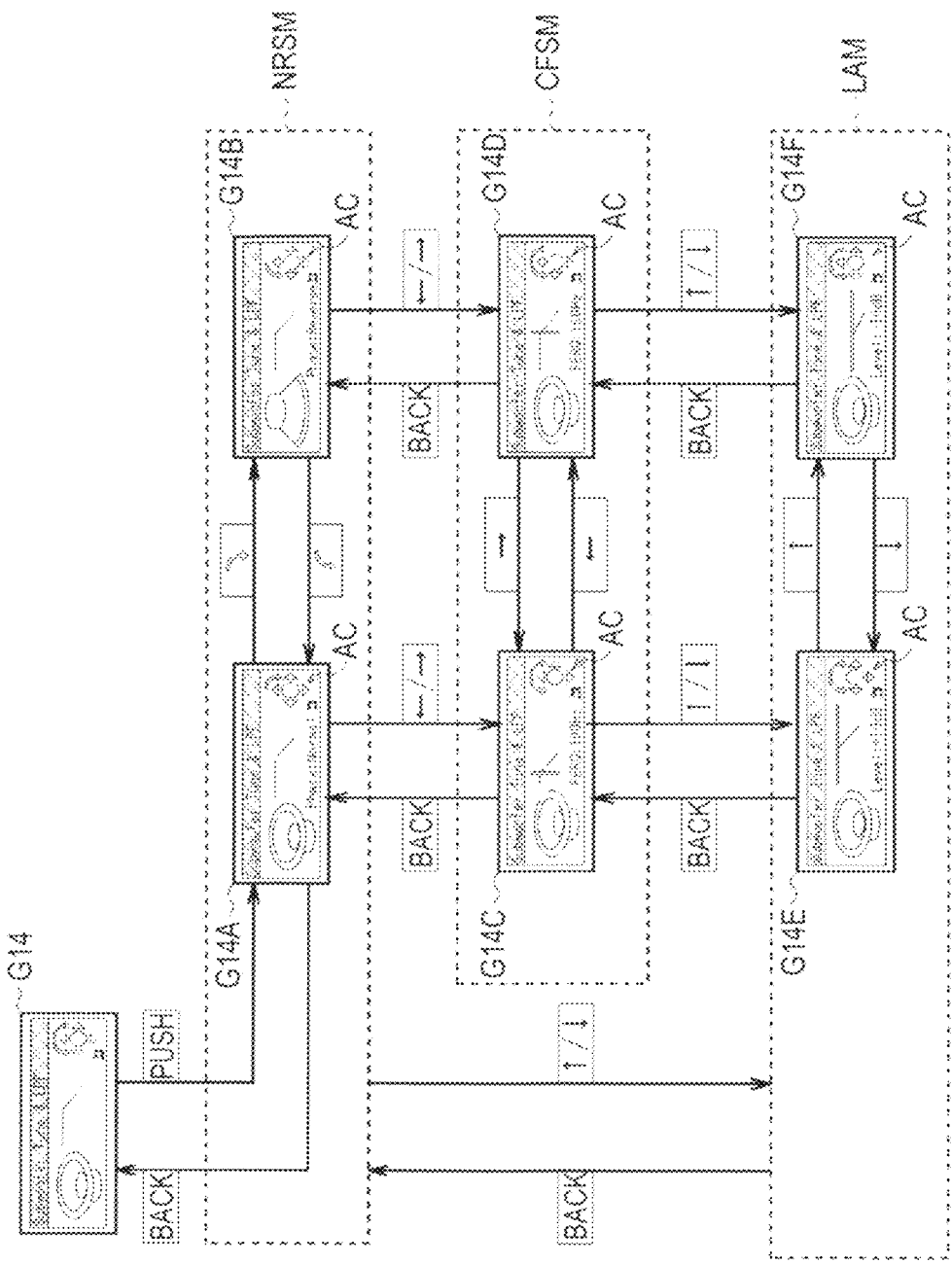
FIG. 21 shows a schematic diagram depicting mode transitions and screen transitions in controlling a subwoofer.

Practically, as shown in FIG. 21, when the knob 14A of the rotary encoder 14 is pressed down in the pressing downward direction PD (FIG. 6) on the subwoofer control screen G14, the system control microcomputer 30 of the main unit 11 changes the mode to the normal/reverse selection mode NRSM.

In the normal/reverse selection mode NRSM, the subwoofer phase in controlling the subwoofer is switched between normal (normal phase) and reverse (reverse phase).

In other words, the system control microcomputer 30 switches the screen between subwoofer control screens G14A and G14B, in response to making an input manipulation to the knob 14A of the rotary encoder 14 in the right rotation direction RRD or in the left rotation direction RLD.

The subwoofer control screen G14A shows the state in which normal (normal phase) is selected for the subwoofer orientation, and the subwoofer control screen G14B shows the state in which reverse (reverse phase) is selected for the subwoofer orientation.

Therefore, the system control microcomputer 30 of the main unit 11 selects the subwoofer phase, in response to making an input manipulation to the knob 14A of the rotary encoder 14 in the right rotation direction RRD or in the left rotation direction RLD.

Then, the system control microcomputer 30 of the main unit 11 presents the result when the subwoofer phase is selected by the pattern of the subwoofer control screen G14A or G14B.

In addition, when normal (normal phase) is selected on the subwoofer control screen G14A, an input manipulation is inoperable to the knob 14A of the rotary encoder 14 in the left rotation direction RLD. Therefore, the system control microcomputer 30 switches off the left rotation direction mark RLM of the manipulation icon AC (FIG. 16B).

In addition, when reverse (reverse phase) is selected on the subwoofer control screen G14B, an input manipulation is inoperable to the knob 14A of the rotary encoder 14 in the right rotation direction RRD. Therefore, the system control microcomputer 30 switches off the right rotation direction mark RRM of the manipulation icon AC (FIG. 16A).

When an input manipulation is made to the knob 14A of the rotary encoder 14 in the left direction LD or in the right direction RD on the subwoofer control screens G14A and G14B, the system control microcomputer 30 changes the mode to the cutoff frequency selection mode CFSM.

In the cutoff frequency selection mode CFSM, the cutoff frequency of the subwoofer can be switched to any one of 100 Hz and 160 Hz, for example, in controlling the subwoofer.

In other words, the system control microcomputer 30 sets the cutoff frequency to any one of 80 Hz, 100 Hz, 120 Hz, 140 Hz, 160 Hz, and OFF, in response to making an input manipulation to the knob 14A of the rotary encoder 14 in the left direction LD or in the right direction RD.

Consequently, the system control microcomputer 30 displays the selected result of the cutoff frequency on a subwoofer control screen G14C or G14D.

The subwoofer control screen G14C shows the state in which 100 Hz is selected for the cutoff frequency, and the subwoofer control screen G14D shows the state in which 160 Hz is selected for the cutoff frequency.

Therefore, the system control microcomputer 30 selects the cutoff frequency of the subwoofer in response to making an input manipulation to the knob 14A of the rotary encoder 14 in the left direction LD or in the right direction RD, and presents the result on the subwoofer control screen G14C or G14D.

In addition, when 100 Hz is selected for the cutoff frequency on the subwoofer control screen G14C, an input manipulation is inoperable to the knob 14A of the rotary encoder 14 in the left direction RD. Therefore, the system control microcomputer 30 switches off the left direction mark LM of the manipulation icon AC (FIG. 15A).

In addition, when 160 Hz is selected for the cutoff frequency on the subwoofer control screen G14D, an input manipulation is inoperable to the knob 14A of the rotary encoder 14 in the right direction RD. Therefore, the system control microcomputer 30 switches off the right direction mark RM of the manipulation icon AC (FIG. 15B).

Subsequently, when an input manipulation is made to the knob 14A of the rotary encoder 14 in the upward direction UD or in the downward direction DD on the subwoofer control screens G14C and G14D, the system control microcomputer 30 changes the mode to the level adjustment mode LAM.

In the level adjustment mode LAM, the output level from the subwoofer can be changed from −10 dB to +10 dB at the maximum.

Practically, the system control microcomputer 30 adjusts the output level through subwoofer control screens G14E and G14F in response to making an input manipulation to the knob 14A of the rotary encoder 14 in the upward direction UD or in the downward direction DD, and displays the adjusted result.

The subwoofer control screen G14E shows the state in which the output level of the subwoofer is set to +10 dB, and the subwoofer control screen G14F shows the state in which the output level of the subwoofer is set to −10 dB.

In addition, also in the level adjustment mode LAM, the system control microcomputer 30 switches the screen between the subwoofer control screens G14E and G14F, in response to making an input manipulation to the knob 14A of the rotary encoder 14 in the upward direction UD or in the downward direction DD.

In addition, in the case of the subwoofer control screen G14E, the output level of the subwoofer is set to +10 dB at the maximum level, and an input manipulation is inoperable to the knob 14A of the rotary encoder 14 in the upward direction UD. Therefore, the system control microcomputer 30 switches off the upward direction mark UM of the manipulation icon AC (FIG. 14A).

In addition, in the case of the subwoofer control screen G14F, the output level of the subwoofer is set to −10 dB at the maximum level, and an input manipulation is inoperable to the knob 14A of the rotary encoder 14 in the downward direction DD. Therefore, the system control microcomputer 30 switches off the downward direction mark DM of the manipulation icon AC.

In addition, as described above, the system control microcomputer 30 can change the mode from the cutoff frequency selection mode CFSM to the level adjustment mode LAM as well as can directly change the mode from the normal/reverse selection mode NRSM to the level adjustment mode LAM.

When an input manipulation is made to the knob 14A of the rotary encoder 14 in the upward direction UD or in the downward direction DD on the subwoofer control screens G14A and G14B in the normal/reverse selection mode NRSM, the system control microcomputer 30 directly changes the mode to the level adjustment mode LAM.

Particularly, when an input manipulation is made to the knob 14A of the rotary encoder 14 in the upward direction UD or in the downward direction DD on the subwoofer control screen G14A, the system control microcomputer 30 changes the mode to the level adjustment mode LAM corresponding to normal (normal phase).

In addition, when an input manipulation is made to the knob 14A of the rotary encoder 14 in the upward direction UD or in the downward direction DD on the subwoofer control screen G14B, the system control microcomputer 30 changes the mode to the level adjustment mode LAM corresponding to reverse (reverse phase).

As described above, the system control microcomputer 30 can change the mode among the normal/reverse selection mode NRSM, the cutoff frequency selection mode CFSM, and the level adjustment mode LAM on the subwoofer control screen G14, and can control the subwoofer in the individual modes.

Therefore, because the system control microcomputer 30 displays the selected results and adjusted results in the individual modes as the results are reflected on the subwoofer control screen G14 all the time, the system control microcomputer 30 can allow the user to control the subwoofer while the user visually recognizes the selected results and adjusted results before without returning the screen to previous ones. In addition, such a scheme may be possible that the system control microcomputer 30 forcedly returns the screen to the subwoofer control screen G14 when the back button 13B of the manipulation button group 13 is pressed down in any one of the normal/reverse selection mode NRSM, the cutoff frequency selection mode CFSM, and the level adjustment mode LAM.

1-6. Operations and Advantages

In the configurations described above, the system control microcomputer 30 of the main unit 11 in the car audio system 10 displays the equalizer control screen G13 for conducting the sound setting process on the display 15 through the display microcomputer 20 of the front panel 12.

The system control microcomputer 30 allows the user to manipulate only the rotary encoder 14 capable of making four dimensional input manipulations for conducting all of "the band selection mode", "the center frequency and Q selection mode", and "the level adjustment mode" just on the equalizer control screen G13.

At this time, because the system control microcomputer 30 can lead the user to next input manipulations while the selected results and adjusted results in the individual modes so far are reflected, the system control microcomputer 30 can allow the user to visually imagine the result of controlling the equalizer through the equalizer control screen G13.

In addition, because the system control microcomputer 30 can guide the user to directions to manipulate the rotary encoder 14 through the manipulation icon AC, the system control microcomputer 30 can allow the user to make operable input manipulations for efficiently obtaining the result of controlling the equalizer.

In addition, the system control microcomputer 30 of the main unit 11 in the car audio system 10 displays the subwoofer control screen G14 for conducting the sound setting process on the display 15 through the display microcomputer 20 of the front panel 12.

The system control microcomputer 30 allows the user to manipulate only the rotary encoder 14 capable of making four dimensional input manipulations for conducting all "the normal/reverse selection mode", "the cutoff frequency selection mode", and "the level adjustment mode" just on the subwoofer control screen G14.

At this time, because the system control microcomputer 30 can lead the user to next input manipulations while the selected results and adjusted results in the individual modes so far are reflected, the system control microcomputer 30 can allow the user to visually imagine the result of controlling through the subwoofer through the subwoofer control screen G14.

In addition, because the system control microcomputer 30 can guide the user to directions to manipulate the rotary encoder 14 through the manipulation icon AC, the system control microcomputer 30 can allow the user to make operable input manipulations for efficiently obtaining the result of controlling the subwoofer.

According to the configurations above, in the car audio system 10, the result of controlling the equalizer can be efficiently provided to the user while the user is allowed to recognize the overall processes in controlling the equalizer only on the equalizer control screen G13 without forcing the user to perform complicated manipulations.

In addition, in the car audio system 10, the result of controlling the subwoofer can be efficiently provided to the user while the user is allowed to recognize the overall processes in controlling the subwoofer only on the subwoofer control screen G14 without forcing the user to perform complicated manipulations.

2. Other Embodiments

In addition, in the embodiment described above, the cases are described in which the rotary encoder 14 is used as a manipulating unit to provide the result of controlling the equalizer and the result of controlling the subwoofer.

However, the embodiment of the invention is not limited to this. Such a scheme may be possible that the result of controlling the equalizer and the result of controlling the subwoofer are provided, in response to input manipulations made by various other manipulating units such as a manipulation button, a slider, and a switch other than the rotary encoder 14.

In addition, in the embodiment described above, the case is described in which the sound setting apparatus according to the embodiment of the invention is adapted to the car audio system 10 having a separate structure in which the main unit 11 and the front panel 12 are detachably mounted.

However, the embodiment of the invention is not limited to this. Such a scheme may be possible that the sound setting apparatus according to the embodiment of the invention is adapted to a car audio system having a structure in which the main unit and the front panel are combined in one piece.

Moreover, in the embodiment described above, the case is described in which the system control microcomputer 30 as a band setting unit makes a selection from the preset frequency bands "LOW", "MID", and "HIGH" to set the band.

However, the embodiment of the invention is not limited to this. Such a scheme may be possible that the system control microcomputer 30 sets a more specific frequency band to the band, in response to input manipulations to the rotary encoder 14.

Moreover, in the embodiment described above, the case is described in which the system control microcomputer 30 as a level setting unit makes an adjustment within the preset range of −10 dB to +10 dB to set the output level.

However, the embodiment of the invention is not limited to this. Such a scheme may be possible that the system control microcomputer 30 makes adjustments in a broader range to set the output level, in response to input manipulations to the rotary encoder 14.

Moreover, in the embodiment described above, the case is described in which the system control microcomputer 30 as a center frequency setting unit selects any one of two preset center frequencies (60 Hz and 100 Hz) to set the center frequency.

However, the embodiment of the invention is not limited to this. Such a scheme may be possible that the system control microcomputer 30 adjusts frequencies to a given frequency to set the center frequency, in response to input manipulations to the rotary encoder 14.

Moreover, in the embodiment described above, the case is described in which the system control microcomputer 30 as a center frequency setting unit to select any one of four presets of Q ("0.5", "1.0", "1.5", and "2.0") to set Q.

However, the embodiment of the invention is not limited to this. Such a scheme may be possible that the system control microcomputer 30 sets a given value to Q, in response to input manipulations to the rotary encoder 14.

Moreover, in the embodiment described above, the case is described in which the display 15 formed of an FL lamp is used as a display unit. However, the embodiment of the invention is not limited to this. Such a scheme may be possible that a liquid crystal display or an LED display is used.

The sound setting apparatus and the sound setting method according to the embodiment of the invention can be adapted not only to the car audio system but also to home audio systems, personal computers capable of outputting sounds, car navigation systems, cellular telephones, and game machines, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A sound setting apparatus comprising:
a manipulating unit capable of making an input manipulation through movement of a single knob in upward and downward directions, left and right directions, rotation directions, and a push down direction;
a band setting unit that sets each of individual sound frequency bands corresponding to low frequencies, midrange frequencies, and high frequencies in controlling an equalizer, in response to an input manipulation to the manipulating unit in the left and right directions;
a level setting unit that sets an output level of each of the bands set by the band setting unit, in response to an input manipulation to the manipulating unit in the upward and downward directions;
a center frequency setting unit that sets a center frequency of each of the bands set by the band setting unit, in response to an input manipulation to the manipulating unit in the rotation directions; and
a display unit that collectively displays setting images to set the band, the output level, and the center frequency on a screen on the same layer, the layer being selected by moving the knob in the push down direction,
wherein the display unit displays a manipulation image for guiding manipulation directions to make the input manipulation to the manipulating unit on the screen on the same layer at the same time, wherein the display unit displays the manipulation image indicating only a direction that allows the input manipulation to the manipulating unit, when a setting operation is conducted by the band setting unit, the level setting unit, or the center frequency setting unit, and wherein the manipulation image includes an indicator for each of the upward, downward, left, right, rotation, and push down directions, and for each of the upward, downward, left, right, rotation, and push down directions that is operable at a given time the corresponding indicator is highlighted.

2. The sound setting apparatus according to claim 1, wherein the center frequency setting unit sets sharpness Q as tied to a value of the center frequency, when setting the center frequency.

3. The sound setting apparatus according to claim 2, wherein the display unit reflects the setting images so far, when a setting operation is conducted by the band setting unit, the level setting unit, or the center frequency setting unit.

4. A sound setting method comprising the steps of:
setting each of individual sound frequency bands corresponding to low frequencies, midrange frequencies, and high frequencies by a band setting unit in controlling an equalizer, in response to making an input manipulation to a manipulating unit through movement of a single knob in left and right directions, the manipulating unit capable of making an input manipulation in upward and downward directions, the left and right directions, rotation directions, and a push down direction;
setting an output level of each of the bands, in response to making an input manipulation to the manipulating unit in the upward and downward directions;
setting a center frequency of each of the bands, in response to making an input manipulation to the manipulating unit in the rotation directions; and collectively displaying setting images to set the band, the output level, and the center frequency by a display unit on a screen on the same layer, the layer being selected by moving the knob in the push down direction, wherein the setting steps are conducted regardless of order, wherein the display step displays a manipulation image for guiding manipulation directions to make the input manipulation to the manipulating unit on the screen on the same layer at the same time, wherein the display step displays the manipulation image indicating only a direction that allows the input manipulation to the manipulating unit, when conducting a setting operation of the frequency band, the output level, or the center frequency, and wherein the manipulation image includes an indicator for each of the upward, downward, left, right, rotation, and push down directions, and for each of the upward, downward, left, right, rotation, and push down directions that is operable at a given time the corresponding indicator is highlighted.

5. The sound setting method according to claim 4, wherein the setting step sets sharpness Q as tied to a value of the center frequency, when setting the center frequency.

6. The sound setting method according to claim 5, wherein the display step reflects the setting images so far, when conducting a setting operation of the frequency band, the output level, or the center frequency.

* * * * *